(12) United States Patent
Bejcek

(10) Patent No.: US 12,543,634 B2
(45) Date of Patent: Feb. 10, 2026

(54) DISPLAY SYSTEM FOR LAWNMOWER AND LAWNMOWER INCLUDING DISPLAY SYSTEM

(71) Applicant: Honda Motor Co., Ltd., Tokyo (JP)

(72) Inventor: Andrew Edwin Bejcek, Saline, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 776 days.

(21) Appl. No.: 17/942,473

(22) Filed: Sep. 12, 2022

(65) Prior Publication Data

US 2024/0081173 A1 Mar. 14, 2024

(51) Int. Cl.
| | |
|---|---|
| *A01D 34/00* | (2006.01) |
| *A01D 34/82* | (2006.01) |
| *B60K 35/10* | (2024.01) |
| *B60K 35/21* | (2024.01) |
| *B60K 35/28* | (2024.01) |
| *B60K 35/60* | (2024.01) |
| *B60K 35/65* | (2024.01) |
| *B62D 1/12* | (2006.01) |

(52) U.S. Cl.
CPC ......... *A01D 34/001* (2013.01); *A01D 34/824* (2013.01); *B60K 35/10* (2024.01); *B60K 35/21* (2024.01); *B60K 35/28* (2024.01); *B60K 35/60* (2024.01); *B60K 35/65* (2024.01); *B62D 1/12* (2013.01)

(58) Field of Classification Search
None
See application file for complete search history.

(56) References Cited

U.S. PATENT DOCUMENTS

| | | | |
|---|---|---|---|
| 3,570,227 A | * | 3/1971 | Bellinger ............. A01D 34/008 56/DIG. 15 |
| 6,021,373 A | | 2/2000 | Zuercher et al. |
| 6,044,632 A | | 4/2000 | Schmalz et al. |
| 6,173,233 B1 | | 1/2001 | Janutka et al. |
| 6,808,032 B2 | | 10/2004 | Wuertz et al. |
| 7,953,526 B2 | | 5/2011 | Durkos et al. |
| 8,522,901 B1 | | 9/2013 | VanLue |
| 8,668,036 B2 | | 3/2014 | Wyatt et al. |
| 9,491,903 B2 | | 11/2016 | Dwyer |
| 9,679,419 B2 | | 6/2017 | Dwyer |

(Continued)

*Primary Examiner* — Abdhesh K Jha
(74) *Attorney, Agent, or Firm* — KENEALY VAIDYA LLP

(57) ABSTRACT

A display system for a drive-by-wire lawnmower having first and second motors can include first and second operator inputs configured to transmit a first and second motor signals, respectively, first and second displays mounted on the first and second operator inputs, respectively, and a controller. The controller can be configured for electrical communication with the first motor, the second motor, and in electrical communication with the first operator input, the second operator input, the first display, and the second display. The controller can be configured to determine a respective drive speed and a respective drive direction for each of the first motor and the second motor based on both of the first drive signal and the second drive signal, and cause the first display and the second display to present a predetermined pattern based on the first motor signal and the second motor signal.

20 Claims, 13 Drawing Sheets

(56) References Cited

U.S. PATENT DOCUMENTS

| | | |
|---|---|---|
| 9,841,768 B2 | 12/2017 | Hiramatsu et al. |
| 10,589,670 B2* | 3/2020 | Dwyer .................... B62D 1/12 |
| 10,638,661 B2 | 5/2020 | Kawai et al. |
| 10,814,887 B1 | 10/2020 | Sutton, Jr. |
| 2006/0277884 A1 | 12/2006 | Bucher |
| 2016/0251003 A1* | 9/2016 | Weihl ........................ B60T 7/12 |
| | | 701/70 |
| 2017/0135277 A1 | 5/2017 | Hiramatsu et al. |
| 2018/0160619 A1 | 6/2018 | Manji et al. |
| 2020/0021210 A1 | 1/2020 | Schulenberg et al. |
| 2022/0354048 A1* | 11/2022 | Wendt ................ B60K 7/0007 |

\* cited by examiner

DISPLAY SYSTEM FOR LAWNMOWER AND LAWNMOWER INCLUDING DISPLAY SYSTEM

BACKGROUND

The disclosed subject matter relates to a self-propelled lawnmower. More particularly, the disclosed subject matter relates to methods and apparatus that display a plurality of illuminating patterns based on the operating conditions of the lawnmower.

A lawnmower can include an electric motor, an internal combustion engine or a hybrid system that includes an electric motor and an internal combustion engine. The lawnmower can be propelled by at least a pair of wheels or by one or more pairs of tracks where each drive wheel/track is driven by a respective motor out of a pair of motors. These vehicles can include a pair of operator inputs—a respective one for each drive motor. The pair of operator inputs can permit an operator to control each drive motor individually to cause forward travel, reverse travel and facilitate turning of the vehicle. Each of the operator inputs can include a control lever and a mechanical linkage connected to the respective drive motor and control lever. Each mechanical linkage can transmit the direction of movement of the respective control lever to a mechanical actuator that translates the movement of the control lever into a drive direction (i.e., forward or reverse) and the magnitude of movement into a rotational speed at which the respective motor is driven. Driving the motors in the same direction and at the same speed can cause the vehicle to travel in a straight path. Driving the motors in the same direction but at different speeds can cause the vehicle to travel in a curved path. Driving one of the drive motors in a forward direction and the other drive motor in a reverse direction can permit the vehicle to spin about its yaw axis. A vehicle that can spin about its yaw axis can be referred to as a zero-turn-radius ("ZTR") vehicle or a zero turn vehicle.

SUMMARY

Some embodiments are directed to a display system for a drive-by-wire lawnmower including a first motor and a second motor. The display system can include a first operator input configured to transmit a first motor signal, a second operator input configured to transmit a second motor signal, a first display mounted on the first operator input, a second display mounted on the second operator input, and a controller. The controller can be configured for electrical communication with the first motor, the second motor, and in electrical communication with the first operator input, the second operator input, the first display, and the second display. The controller can be configured to determine a respective drive speed and a respective drive direction for each of the first motor and the second motor based on both of the first drive signal and the second drive signal, and cause the first display and the second display to present a predetermined pattern based on the first motor signal and the second motor signal.

Some embodiments are directed to a display system for a lawnmower including a first motor and a second motor. The display system can include first operator handle, a second operator handle, and a controller. The first operator handle can be configured to transmit a first motor signal and include a first hand grip, a first display, and a first space spacing the first display away from the first hand grip. The second operator handle can be configured to transmit a second motor signal and include a second hand grip, a second display, and a second space spacing the second display away from the second hand grip. The controller can be configured to be in electrical communication with the first motor, the second motor and in electrical communication with the first operator input, the second operator input, the first display, and the second display. The controller is configured to determine a respective drive speed and a respective drive direction for each of the first motor and the second motor based on both of the first motor signal and the second motor signal, select from a plurality of display patterns that are different from each other based on the first motor signal and the second motor signal, and cause the first display and the second display to present a selected one of the display patterns.

Some embodiments are directed to a lawnmower that can include a frame, a mower deck, a first motor, a second motor, a first wheel, a second wheel, a first operator handle, a second operator handle, and a controller. The mower deck can be suspended from the frame and include at least one cutting chamber and at least one blade rotatably mounted in the cutting chamber. The first wheel can be connected to the frame and the first motor and the second wheel can be connected to the frame and the second motor. The first control lever can be pivotally mounted on the frame, configured to transmit a first motor signal, and include a first hand grip, and a first display. The second control lever can be pivotally mounted on the frame, configured to transmit a second motor signal, and include a second hand grip, and a second display. The controller can be in electrical communication with the first motor, the second motor, the first operator input, the second operator input, the first display, and the second display. The controller is configured to determine a drive speed and a drive direction for each of the first motor and the second motor based on both of the first motor signal and the second motor signal, cause the first motor and second motor to operate according to the drive speed and the drive direction, select from a plurality of display patterns that are different from each other based on the first motor signal and the second motor signal, and cause the first display and the second display to present a selected one of the display patterns.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
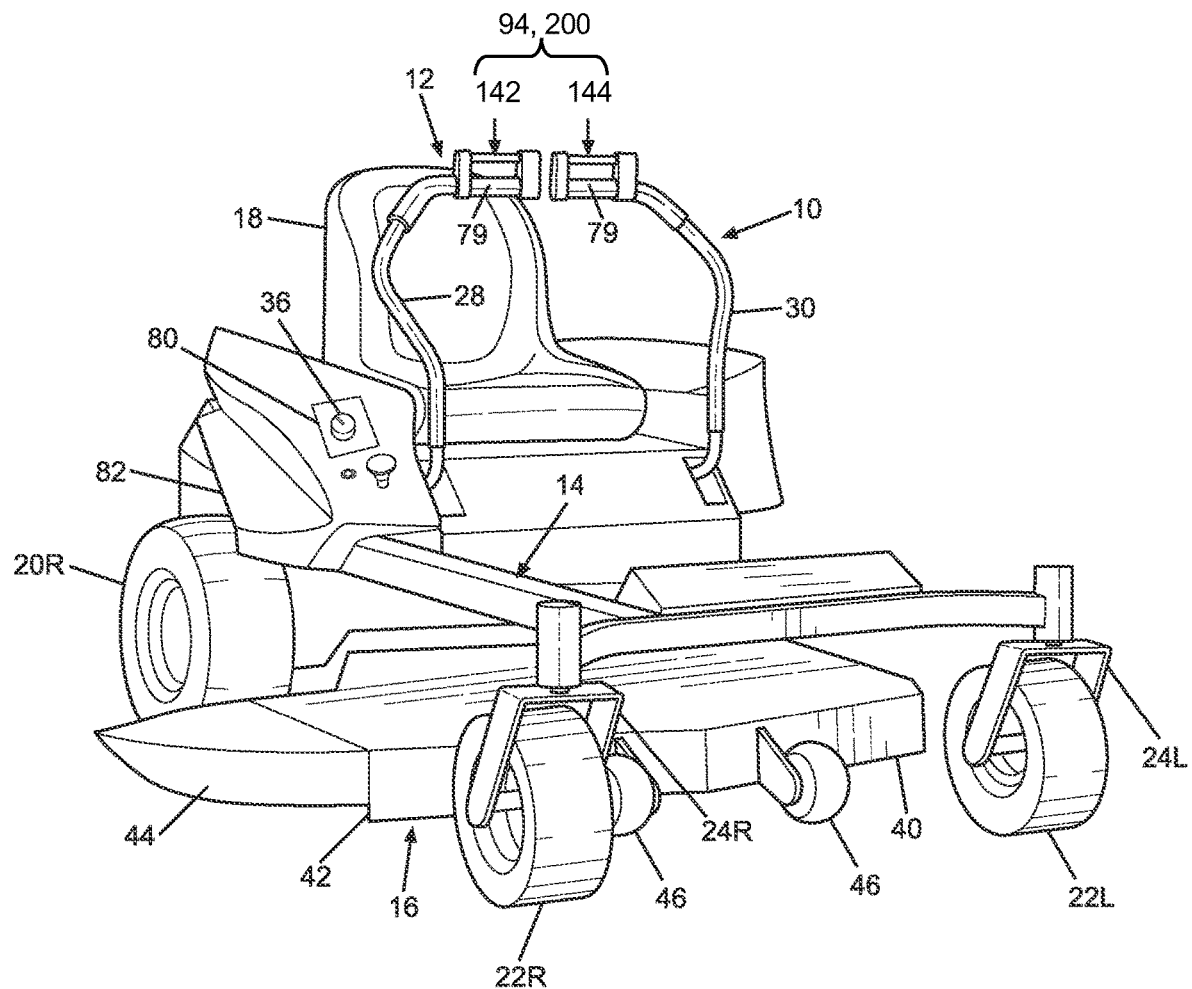
FIG. 1 is a perspective view of a lawnmower that includes a drive-by-wire system made in accordance with principles of the disclosed subject matter.

It can be advantageous to replace the mechanical linkage between the operator inputs and the respective drive motor with a drive-by-wire system in a vehicle, such as but not limited to a skid-steer vehicle, a tracked vehicle, or a lawnmower. FIG. 1 illustrates an embodiment of a drive-by-wire system 10 for a lawnmower 12 made in accordance with principles of the disclosed subject matter. The drive-by-wire system 10 can selectively operate in a first mode or in a second mode. The first mode can be configured to emulate a conventional mechanical linkage between the operator input and the respective drive motor. In the second mode, the drive-by-wire system 10 can simplify the input by the operator to cause the lawnmower 12 to travel in a straight path and easily allow the operator to maintain a straight path of travel regardless of the terrain over which the lawnmower 12 is travelling. Further, the drive-by-wire system 10 can improve operator comfort and reduce operator fatigue by automating certain operations, such as but not limited to auto-turning. In either the first mode or the second mode, the drive-by-wire system 10 can enhance safe operation, provide or enhance obstacle detection and avoidance, and provide or enhance emergency stopping capability. Further still, the drive-by-wire system 10 can be applied to a lawnmower 12 that is powered by an internal combustion engine as well as to a lawnmower 12 that is powered by a battery.

Some work vehicles, such as but not limited to lawnmowers, might lack an information display (also referred to as a dashboard or an instrument cluster or a combination meter or a meter) that provides the operator with information regarding the operating parameter(s) of the work vehicle. The drive-by-wire system 10 can include a display system 200 that is configured to present the operator with audible and/or visual information regarding the operational status of the lawnmower 12 such as but not limited to turning speed, turning direction, tilt angle, and obstacle location.

The display system 200 that can include at least one display device 94 that is configured to provide the operator with information indicative of operational conditions of the lawnmower 12. For example, the display system 200 can convey with any one of plurality of predetermined patterns that respectively indicate a tilt condition, an obstacle detection condition, a turning condition, or a normal condition of the lawnmower 12. A predetermined tilt warning pattern can indicate the severity of the tilt angle of the lawnmower 12 and the high side of the lawnmower 12 when the operational condition of the lawnmower 12 corresponds to a tilt condition. A predetermined obstacle warning pattern can indicate the relative distance and direction to an obstacle in or near the path of travel of the lawnmower 12 when the operational condition of the lawnmower 12 corresponds to the obstacle condition. A predetermined scrolling pattern can indicate the turning direction of the lawnmower 12 when the operational condition of the lawnmower 12 corresponds to the turning condition. A predetermined normal pattern can indicate that the operational condition of the lawnmower 12 does not merit special attention by the operator. Thus, the display system 200 can increase the operator's awareness of one or more operational parameter(s) of the lawnmower 12.

Figure 2:
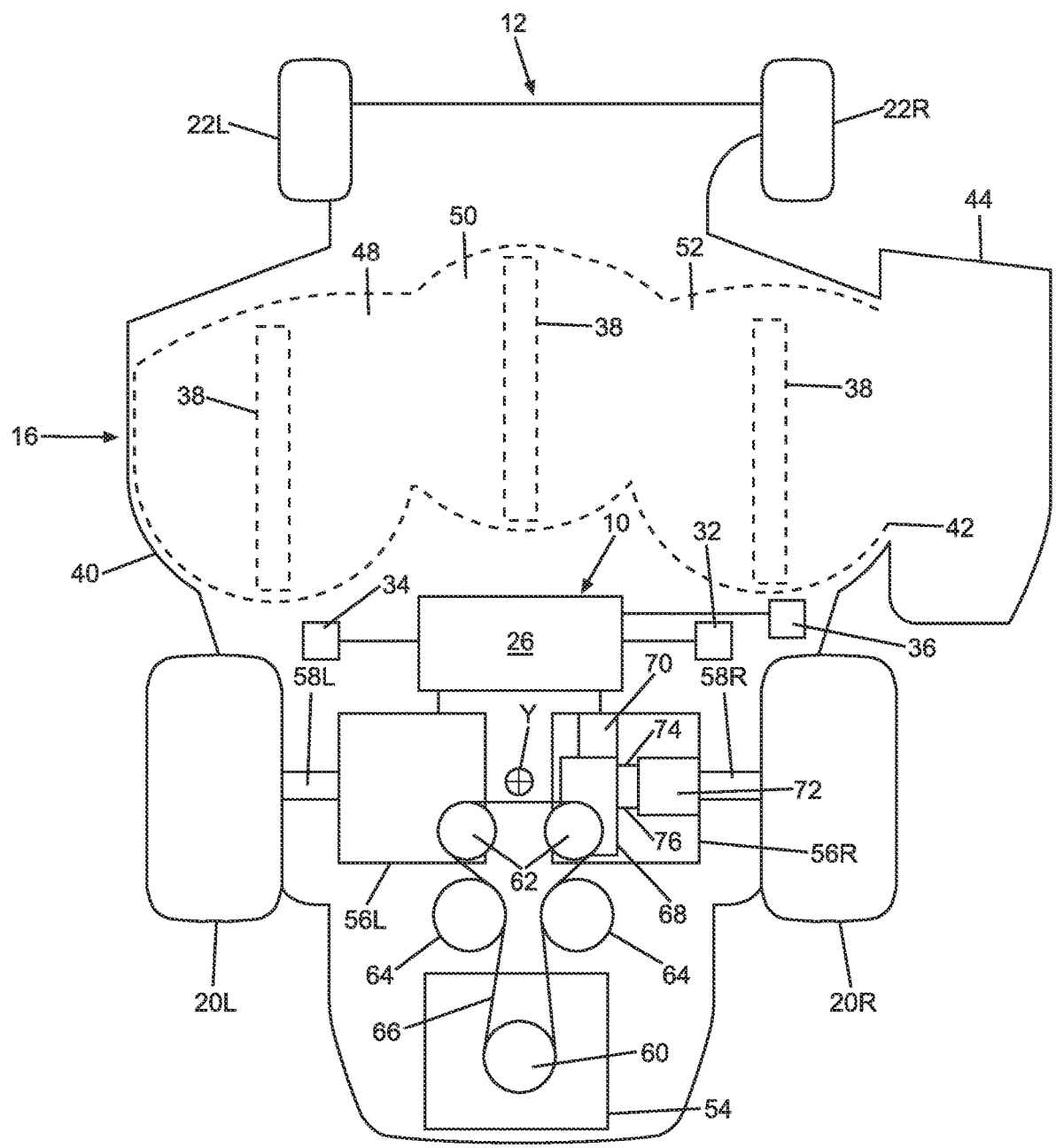
FIG. 2 is a schematic view of the lawnmower of FIG. 1.

FIG. 2 is a schematic representation of the lawnmower 12 of FIG. 1. Referring to FIGS. 1 and 2 collectively, the lawnmower 12 can include a main frame 14, a mower deck 16, a seat 18, a pair of drive wheels 20L, 20R, a pair of caster wheels 22L, 22R and a pair of front forks 24L, 24R. The left drive wheel 20L is obstructed from view in FIG. 1. The drive-by-wire system 10 can include a controller 26, a pair of control levers 28, 30, a pair of sensors and a 32, 34 mode selector 36.

Referring to FIG. 1, the main frame 14 can support the seat 18 and the control levers 28, 30. The mower deck 16 can be suspended from the main frame 14. Each of the drive wheels 20L, 20R can be connected to the main frame 14. The main frame 14 can pivotally support the front forks 24L, 24R, and the front forks 24L, 24R can rotatably support the caster wheels 22L, 22R.

The mower deck 16 can be referred to as a deck, a deck assembly, a blade deck, a cutter housing, or a cutter housing assembly. Returning to FIGS. 1 and 2 collectively, the mower deck 16 can house a plurality of blades 38 and include a housing 40, a discharge opening 42, a discharge chute guard 44 and a plurality of wheel assemblies 46. The wheel assemblies 46 can keep the mower deck 16 at a predetermined minimum height above the ground over which the lawnmower 12 traverses. Each blade assembly 38 can include one blade or a pair of blades rotationally offset with respect to one another. The housing 40 can include a plurality of cutting chambers 48, 50, 52 and each blade assembly 38 can rotate within its respective cutting chamber 48 or 50 or 52. The discharge chute guard 44 can be pivotally mounted to the deck 16 adjacent to and above the discharge opening 42.

Referring to FIG. 2, the lawnmower 12 can include a power source 54, a pair of hydrostatic transmissions ("HST") 56L, 56R and a pair of driveshafts 58L, 58R. The power source 54 can include a drive output pulley 60 and each of the HSTs 56L, 56R can include an input pulley 62. The lawnmower 12 can include a pair of idler pulleys 64 and a belt 66 that connects the output pulley 60 to the input pulleys 62 and passes along each of the idler pulleys 64. One of the idler pulleys 64 can be mounted on a tension arm (not shown) so that the one of the idler pulleys 64 can maintain a predetermined tension on the belt 66.

The power source 54 can include a second output pulley (not shown) and the mower deck 16 can include a plurality of driven pulleys (not shown) that are each rotationally connected to a respective one of the blade assemblies 38. The second output pulley can be coaxial with the output pulley 60. The driven pulleys can be coaxial with the respective one of the blade assemblies 38 and rotatably mounted on the top of the mower deck 16. The mower deck 16 can include a blade drive belt (not shown) that is connected to the second output pulley and each of the driven pulleys.

The power source 54 can be an internal combustion engine, an electric motor or a hybrid of an internal combustion engine and an electric motor. The power source configured as an internal combustion engine or a hybrid power source can have the engine output axis oriented in the vertical direction V of the lawnmower 12.

The HSTs 56L, 56R can have the same or similar structure and details of the HSTs 56L, 56R are described with respect to the right HST 56R. The details of the left HST 56L are omitted from FIG. 2 for simplicity and clarity of the drawing. The right HST 56R can include a hydraulic pump 68, an actuator 70, a hydraulic motor 72 and a pair of hydraulic lines 74, 76.

The pump 68 can be connected to and driven by a respective one of the input pulleys 62. The hydraulic lines 74, 76 can fluidly couple the pump 68 and the motor 72 such that hydraulic fluid flows out of the pump 68, into and through the motor 72, and returns to the pump 68. The actuator 70 can be configured to cause the pump 68 to circulate the fluid to and from the motor 72 in a first direction, or in a second direction. The actuator 70 can terminate the flow of the hydraulic fluid between the pump 68 and the motor 72. For example, when the pump 68 outputs fluid to the motor 72 via the first line 74 and the motor 68 returns the fluid via the second line 76, the motor 72 can drive the right wheel 20R in a forward direction. Conversely, when the pump 68 outputs fluid to the motor 72 via the second line 76 and the motor 68 returns the fluid via the first line 74, the motor 72 can drive the right wheel 20R in a reverse direction. The actuator 70 can be configured to cause the pump 68 to vary the flow rate of hydraulic fluid flowing into the motor 72 to vary the speed at which the motor 72 drives the right wheel 20R.

The motor 72 can be connected to and selectively drive the respective driveshaft 58L, 58R, which in turn, drives the corresponding wheel 20L, 20R in a forward direction or a reverse direction depending on an input from the respective one of the control levers 28, 30 located adjacent the lawnmower's seat 18. The belt 66 can be configured to provide a constant rotational input to the input pulleys 62 of each HST 56L, 56R. Thus, both the speed and the direction of rotation of each wheel 20L, 20R can be controlled by the controller 26 based on inputs to the sensors 32, 34 via the control levers 28, 30. The controller 26 can be electrically connected to the actuator 70 of each of the HSTs 56L, 56R to cause the actuator 70 to selectively vary the speed and direction in which the fluid exiting the hydraulic pump 68 drives the hydraulic motor 72. Each of the actuators 70 can include an electric, electronic or electro-mechanical servo that is connected to mechanical structure(s) that can vary the flow rate and which of the lines 74, 76 the fluid exits the pump 68. The servo can be any appropriate device such as but not limited to a rotary motor or a solenoid. The mechanical structure can be any appropriate structure such as but not limited to a swashplate or a valve body.

Figure 3:
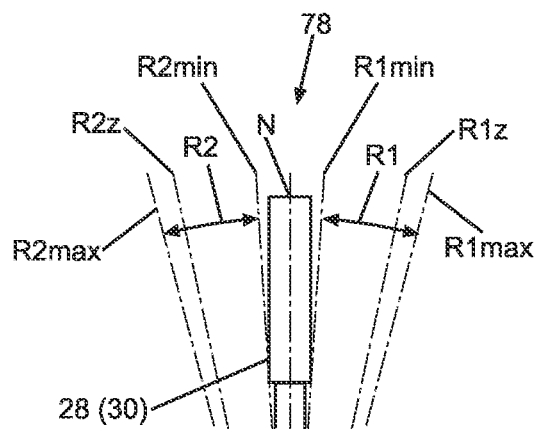
FIG. 3 is a side view of an operator input of the lawnmower of FIG. 1 and shows in phantom a plurality of positions of a control lever of the operator input.
Figure 7:
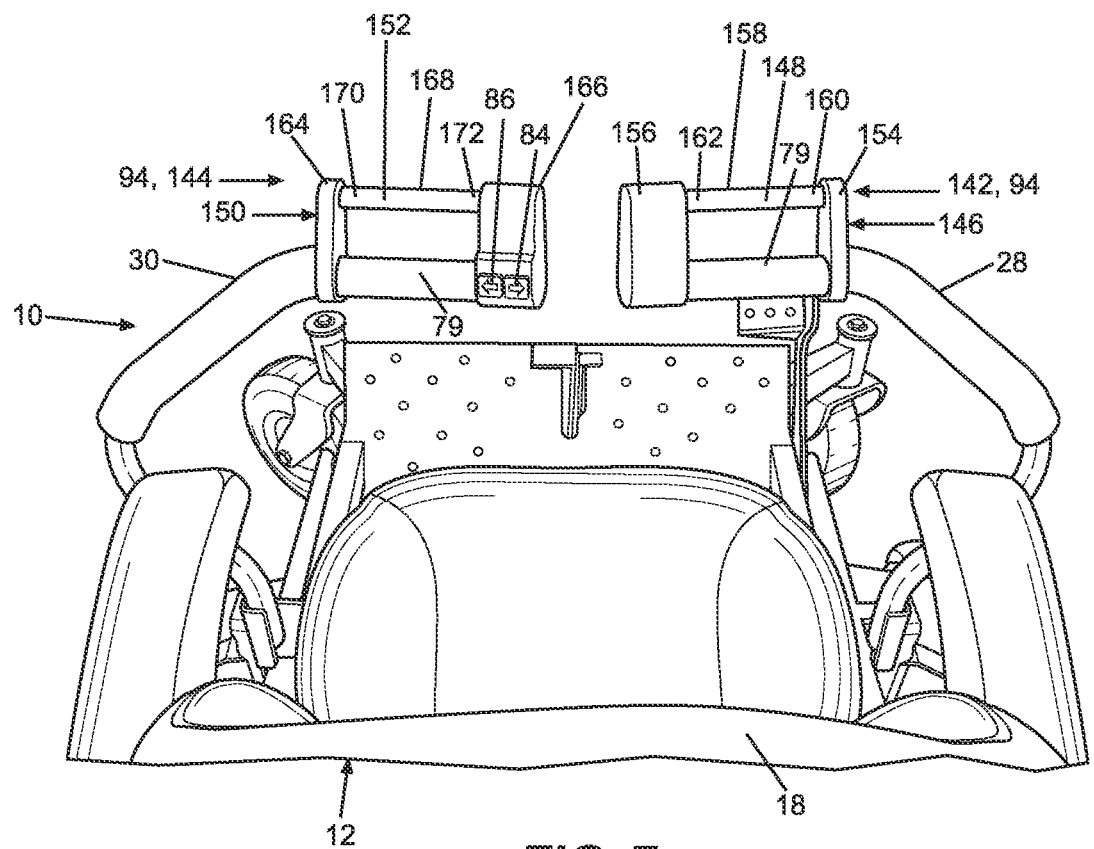
FIG. 7 is a top view of a portion of the lawnmower of FIG. 1 and shows a display system mounted on the control levers.

Referring to FIGS. 1-3 collectively, each of the control levers 28, 30 and the respective one of the sensors 32, 34 can be collectively referred to as an operator input 78. Referring to FIGS. 1 and 7, the display system 200 of the lawnmower 12 can include a display device 94 configured as a pair of display assemblies 142, 144 that provide the operator with information indicative of the operational status of the lawnmower 12. Each of the control levers 28, 30 can include a handle 79 and the display assemblies 142, 144 can be mounted on the respective handle 79. The handle 79 can also be referred to as a hand grip or a grip and the control levers 28, 30 can also be referred to as control handles, drive handles, or drive levers. The operator can use the control levers 28, 30 to signal the controller 26 in which direction and at what speed the operator desires the controller 26 to cause the HSTs 56L, 56R to propel the lawnmower 12. The operator can use the control levers 28, 30 to signal the controller 26 to stop travel of the lawnmower 12.

When the controller 26 drives both HSTs 56L, 56R in the same direction and at the same speed, the lawnmower 12 can travel in a straight path. When the controller 26 drives both of the HSTs 56L, 56R in the same direction but at different speeds, the lawnmower 12 can rotate about its yaw axis Y (FIG. 2) in a clockwise direction or a counterclockwise direction from the perspective of FIG. 2 so that the lawnmower 12 travels along a curved path. The curved path can include an arc of a circle whose radius is inversely proportional to the difference between the driving speeds of the HSTs 56L, 56R. When the controller 26 drives both of the HSTs 56L, 56R at the same speed but drives one of the HSTs 56L, 56R in a forward direction and the other of the HSTs 56L, 56R in a reverse direction, the lawnmower 12 can spin clockwise or counterclockwise about its yaw axis Y to provide a zero-radius turn. The operator can use the control levers 28, 30 to signal the controller 26 to drive the lawnmower 12 straight in the forward direction or in the reverse direction, or turn while traveling in the forward direction or the reverse direction, or spin clockwise or counterclockwise.

The clockwise rotation of the lawnmower 12 while traveling in the forward direction or the reverse direction can also be referred to as a right turning direction from the perspective of the operator or the lawnmower 12. The counterclockwise rotation of the lawnmower 12 while traveling in the forward direction or the reverse direction can also be referred to as a left turning direction from the perspective of the operator or the lawnmower 12.

Referring to FIGS. 1 and 3 collectively, each of the control levers 28, 30 can be pivotally connected to the main frame 14, directly or indirectly, in any appropriate manner such that each of the control levers 28, 30 can pivot independently about a respective pivot axis PA. Referring to FIG. 3, each of the control levers 28, 30 can pivot about the pivot axis PA and into a neutral position N, a first range R1 and a second range R2. The neutral position N can be separate and spaced away from each of the first range R1 and the second range R2. Each of the first range R1 and the second range R2 can include a plurality of positions for the control levers 28, 30. The control levers 28, 30 can pivot from the neutral position N and into the first range R1 in a direction that is away from the seat 18, and from the neutral position N and into the second range R2 in a direction that is toward the seat 18. The control levers 28, 30 can pivot between positions in the first range R1 and the second range R2 without stopping at the neutral position N.

Referring to FIGS. 2 and 3, the sensors 32, 34 can be in electrical communication with the controller 26. The sensors 32, 34 can be any appropriate sensor that can generate a signal that is indicative of the direction in which the respective I control ever 28, 30 is pivoted by the operator and the magnitude of the movement of the respective control lever 28, 30 by the operator. For example, each of the sensors 32, 34 can be a potentiometer, rotary Hall-effect sensor, encoder, or other angle position sensor.

Referring to FIGS. 1-3 collectively, each of the sensors 32, 34 can be configured to generate a signal and transmit the respective signal to the controller 26. The signals can include data indicative of the position of the respective control lever 28, 30 with respect to a first range R1, a second range R2 and a neutral position N. The controller 26 can be configured to determine a speed and a direction of travel requested by the operator of the lawnmower 12 from the signal data. The controller 26 can be configured to process the signal data in accordance with a first process when the controller 26 operates in the first mode and in accordance with a second process when the controller 26 operates in the second mode.

Figure 4:
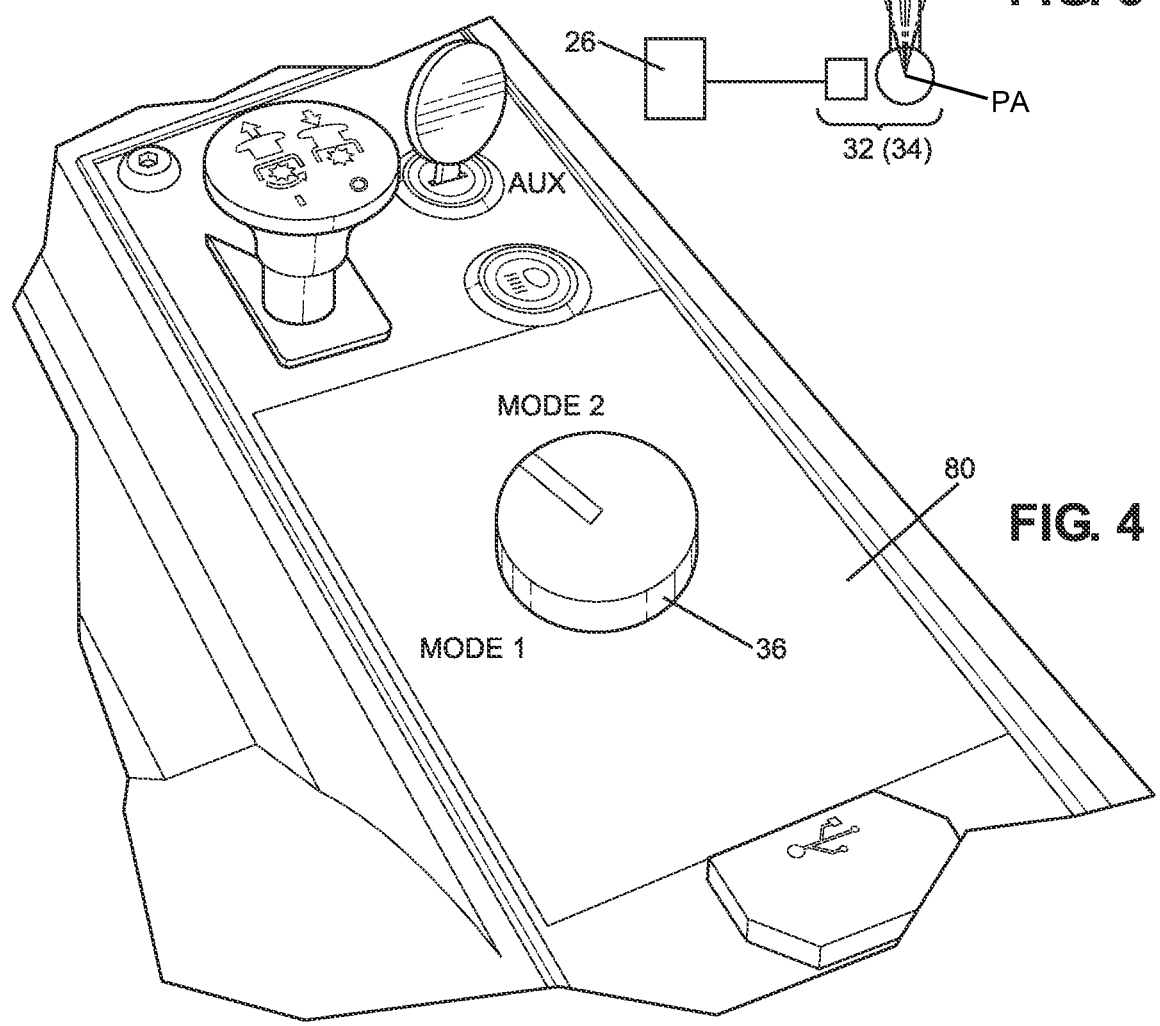
FIG. 4 is a perspective view of a control panel of the lawnmower of FIG. 1.

Referring to FIG. 4, the drive-by-wire system 10 can be selectively operated in the first mode or the second mode based on a selection made by an operator of the lawnmower 12 using the mode selector 36. The mode selector 36 can be mounted at any appropriate location on the lawnmower 12 that is within a suitable reach distance from the operator when the operator is seated in the seat 18. In the exemplary embodiment of FIG. 1, the mode selector 36 can be mounted on a control panel 80 located adjacent to or on the right fender 82 of the lawnmower. The mode selector 36 can be any appropriate type of switch such as but not limited to a rotary dial, a rotary knob, a toggle switch, at least one push button, a magnetic position sensor, at least one touch sensor, or an icon on a touch screen. FIG. 4 illustrates the mode selector 36 as a rotary dial that can be moved between a Mode 1 position and a Mode 2 position.

Returning to FIG. 2, the mode selector 36 can be in electrical communication with the controller 26. The mode selector 36 can be configured to output a first signal when in the Mode 1 position and a second signal that is different from the first signal when in the Mode 2 position. The drive-by-wire system 10 can operate in the first mode when the controller 26 receives the first signal from the mode selector 36 and in the second mode when the controller 26 receives the second signal from the mode selector 36.

Figure 5:
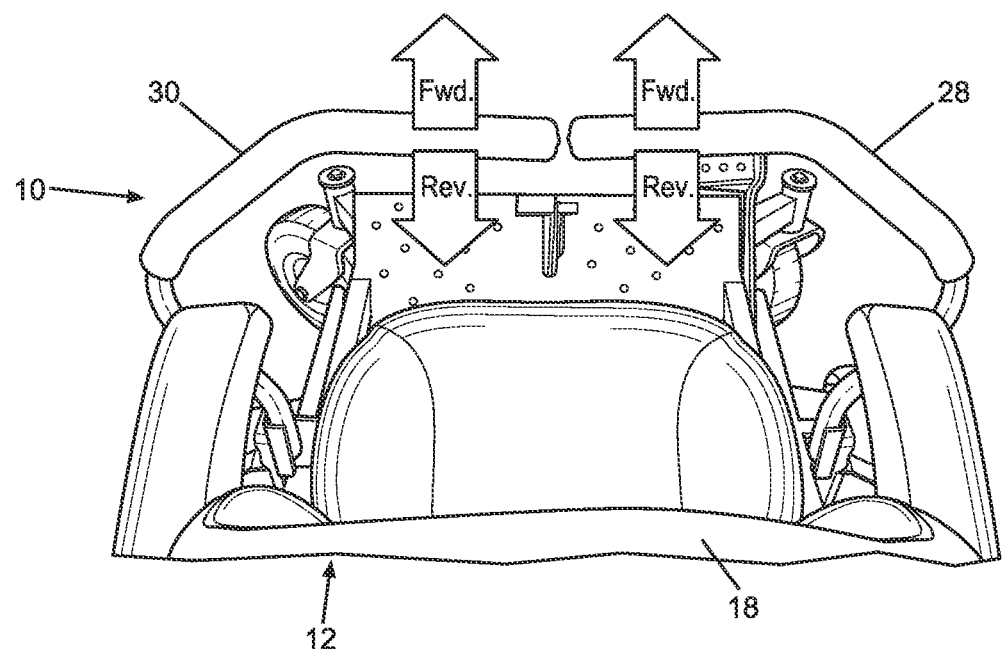
FIG. 5 is a top view of a portion of the lawnmower of FIG. 1 and shows operations of the drive-by-wire system in a first mode.

FIG. 5 illustrates operations of the control levers 28, 30 when the drive-by-wire system 10 operates in the first mode. The display device 94 has been omitted from FIG. 5 for clarity and simplicity of the drawing. The controller 26 can be configured to operate in the first mode such that the controller 26 controls the right HST 56R based only on the signal received from the right sensor 32 and the left HST 56L based only on the signal received from the left sensor 34. That is, the controller 26 can control the right HST 56R independently from the signals received from the left sensor 34 and the left HST 56L independently from the signals received from the right sensor 32.

Specifically, the first range R1 can correspond to a forward direction of travel of the lawnmower 12 and the second range R2 can correspond to a reverse direction of travel of the lawnmower 12. The controller 26 can be configured to drive the right HST 56R in the forward direction when the right control lever 28 is in the first range R1 and in reverse direction when the right control lever 28 is in the second range R2. The controller 26 can be configured to drive the left HST 56L in the forward direction when the left control lever 30 is in the first range R1 and in reverse direction when the left control lever 30 is in the second range R2. If the operator moves the control levers 28, 30 into different relative positions in the first range R1, the controller 26 can drive both of the HSTs 56L, 56R in the forward direction but at different speeds, where the speed of each of the HSTs 56L, 56R corresponds to the position of the respective one of the control levers 28, 30 in the first range R1. If the operator moves the control levers 28, 30 into different relative positions in the second range R2, the controller 26 can drive both of the HSTs 56L, 56R in the reverse direction but at different speeds, where the speed of each of the HSTs 56L, 56R corresponds to the position of the respective one of the control levers 28, 30 in the second range R2.

The controller 26 can be configured to determine a neutral condition and cause the HSTs 56L, 56R to idle when a respective one of the control levers 28, 30 is in the neutral position N. The lawnmower 12 can come to a stop when both of the HSTs 56L, 56R are caused to idle.

The controller 26 can be configured to drive one of the HSTs 56L, 56R in the forward direction and the other of the HSTs 56L, 56R in the reverse direction when the respective one of the control levers 28, 30 is in the first range R1 and the other of the control levers 28, 30 is in the second range R2. If both control levers 28, 30 are placed at the same position while in opposite ranges R1, R2, the controller 26 can drive the HTSs 56L, 56R to spin the lawnmower 12 about its yaw axis Y. However, any variation the positions of the control levers 28, 30 can cause the lawnmower 12 to deviate from a zero-turn-radius. Thus, it can be difficult for an operator to maintain a precise zero-turn-radius in the first mode of the drive-by-wire system 10.

Accordingly, the first mode can emulate the operation of mechanically linked control levers of a conventional ZTR lawnmower. Further, the first mode of the drive-by-wire system 10 can mimic some or all of the deficiencies described above with respect to a conventional ZTR lawnmower.

Figure 6:
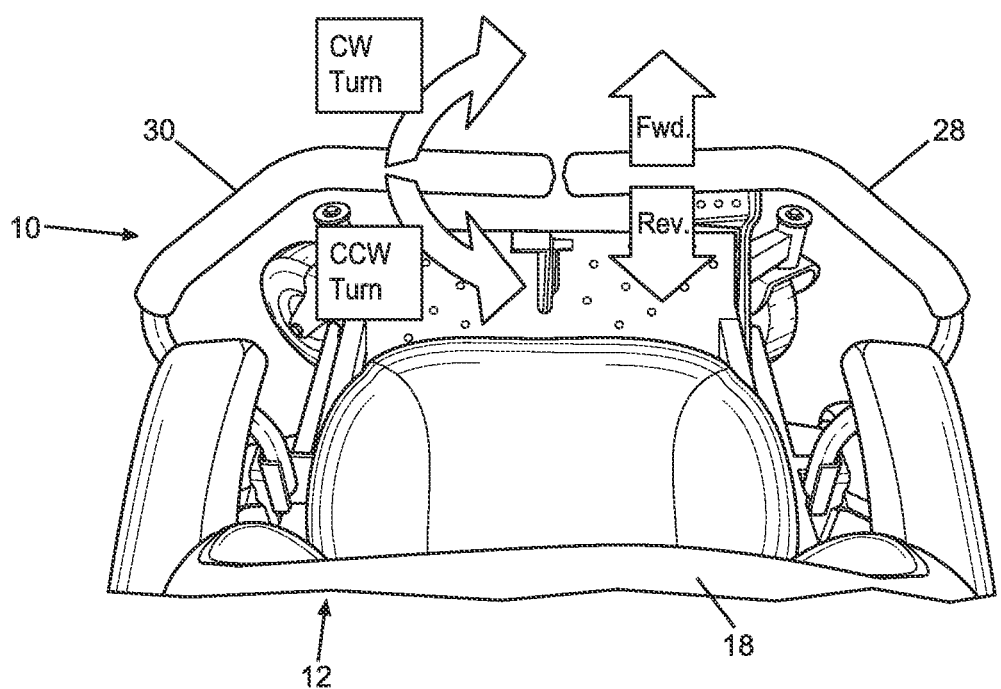
FIG. 6 is a top view of a portion of the lawnmower of FIG. 1 and shows operations of the drive-by-wire system in a second mode.

FIG. 6 illustrates operations of the control levers 28, 30 when the drive-by-wire system 10 operates in the second mode. The display device 94 has been omitted from FIG. 6 for clarity and simplicity of the drawing. The drive-by-wire system 10 can be configured to operate in the second mode such that the right control lever 28 controls the travel speed and the forward direction of travel and reverse direction of travel of the lawnmower 12 and the left control lever 30 controls the steering direction of the lawnmower 12. Further, the second mode of the drive-by-wire system 10 can provide precise or nearly precise zero-turn-radius operation using one of the control levers 28, 30. That is, the drive-by-wire system 10 can be configured to select one drive condition from a plurality of drive conditions that include a straight travel condition, a normal turn condition, and a zero-turn-radius condition. Thus, the second mode can relieve the operator of precise control of both of the control levers 28, 30 when the operator desires a precise or nearly precise straight line tracking or a zero-turn-radius operation.

Specifically, in the second mode, the controller 26 can select the straight condition in which the controller 26 is configured to drive both HSTs 56L, 56R in the forward direction and at the same speed when the right control lever 28 is in the first range R1 and the left control lever 30 is in the neutral position N shown in FIG. 3. Further, the controller 26 can be configured to drive both HSTs 56L, 56R in the reverse direction and at the same speed when the right control lever 28 is in second range R2 and the left control lever 30 is in the neutral position N shown in FIG. 3. The controller 26 can be configured to set the same speed for both HSTs 56L, 56R based on the position of the right control lever 28 in the first range R1 or the second range R2. That is, the operator can use a single one of the control levers 28, 30 to control both HSTs 56L, 56R simultaneously. Thus, the drive-by-wire system 10 can provide a straight line tracking function using only the right control lever 28. This feature can allow an operator to more precisely control the speed of the lawnmower 12 without deviating from the straight line path of the lawnmower 12.

Further, in the second mode, the controller 26 can select the normal turn condition in which the controller 26 drives both of the HSTs 56L, 58R in the same direction but at different speeds, thereby allowing the operator to steer the lawnmower 12 along the desired curved path. When traversing a curved path, one of the wheels 20L, 20R follows an inner curve (or circle) and the other of the wheels 20L, 20R follows an outer curve (or circle). The one of the wheels 20L, 20R that follows the inner curve can be referred to as an inside wheel and the corresponding one of the HSTs 56L, 56R can be referred to as the inside motor. The one of the wheels 20L, 20R that follows the outer curve can be referred to as an outside wheel and the corresponding one of the HSTs 56L, 56R can be referred to as the outside motor. The controller 26 can be configured to determine the right HST 56R is the inside motor and the left HST 56L is the outside motor when the left lever 30 is in the first range R1 shown in FIG. 3. The controller 26 can be configured to determine the right HST 56R is the outside motor and the left HST 56L is the inside motor when the left lever 30 is in the second range R2 shown in FIG. 3.

The controller 26 can be configured to determine an outside wheel speed that directly correlates to the position of the right control lever 28 and a speed reduction amount that directly correlates to the position of the left control lever 30. That is, the operator can set the speed of the turn with the right control lever 28 and the direction of the turn with the left control lever 30. The controller 26 can be configured to determine an inside wheel speed by subtracting the speed reduction amount from the outside wheel speed.

For example, each of the ranges R1, R2 for the left control lever 30 can include a normal turn range that extends from the respective one of the minimum speed locations R1min, R2min to a respective one of a first zero-turn location R1z and a second zero-turn location R2z shown in FIG. 3. The zero-turn locations R1z, R2z can be spaced away from the respective one of the maximum speed locations R1max, R2max by a predetermined angle that can provide a desired zero-turn-radius operation of the lawnmower 12. The outside wheel speed can increase as the right control lever 28 moves from the first minimum speed position R1min or the second minimum speed position R2min to the first zero-turn location R1z or the second zero-turn location R2z, respectively. The speed reduction amount can increase as the left control lever 30 moves from the first minimum speed position R1min or the second minimum speed position R2min to the first zero-turn location R1z or the second zero-turn location R2z, respectively. That is, the radius of the curved path of the lawnmower 12 can decrease as the speed reduction amount increases.

Returning to FIG. 3, the controller 26 can be configured to, in this second mode, execute a zero-radius turn when the left lever 30 is placed in a location that is between and inclusive of the first zero turn location R1z and the first maximum speed location R1max for a clockwise zero-radius turn or in a location that is between and inclusive of second zero turn location R2z and the second maximum speed location R2max for a counterclockwise zero-radius turn. The controller 26 can be configured to drive both of the HSTs 56L, 56R at the same speed but drive the right HST 56R in the reverse direction and the left HST 56L in the forward direction when the left control lever 30 is in any position from the first zero turn location R1z to the first maximum speed location R1max and the right control lever 28 is in any location in either the first range R1 or the second range R2. This can result in a clockwise zero-turn-radius spin of the lawnmower 12 in the frame of reference of FIG. 6. Further, the controller 26 can be similarly configured to cause the lawnmower 12 execute a counterclockwise zero-turn-radius spin when the left control lever 30 any position from the second zero turn location R2z to the second maximum speed location R2max and the right control lever 28 is in any location in either the first range R1 or the second range R2. Thus, the second mode of the drive-by-wire system 10 can provide precise or nearly precise zero-turn-radius operation of the lawnmower 12 using only the left control lever 30.

The controller 26 can be configured to terminate the zero-turn-radius operation of the lawnmower 12 if the operator moves left control lever 30 out of the range of positions between the first zero turn location R1z and the first maximum speed location R1max or between the second zero turn location R2z and the second maximum speed location R2max. This permits the operator to stop the zero-radius turn and resume a straight path operation or normal turn operation by manipulating only one of the two control levers 28, 30, which operation can be the same as or similar to operation of a conventional zero-turn-radius lawnmower.

Further, the controller 26 can be configured to cause both HSTs 56L, 56R to idle when the right control lever 28 is in the neutral position. This can permit the operator to bring the lawnmower to a stop by manipulating only one of the two control levers 28, 30, as compared to operating both levers of a conventional lawnmower in order to stop the conventional lawnmower.

FIG. 7 illustrates a first embodiment of the display device 94 that includes the right display assembly 142 and the left display assembly 144. The right display assembly 142 can include a right housing 146, a right light strip 148 and the left display assembly 144 can include a left housing 150 and a left light strip 152. The handles 79 can be incorporated into the housings 146, 150. The housings 146, 150 can support the respective one of the light strips 148, 152 on the respective one of the levers 28, 30. The light strips 148, 152 can include a plurality of color light emitting diodes ("LEDs") distributed along the length of the light strips 148, 152.

The right housing 144 can include a right outer support 154, and right inner support 156 and a right frame 158 that extends from and is connected each of the supports 154, 156. The supports 154, 156 can be cantilevered to the handle 79 of the right control lever 28 and the frame 158 can extend from and be connected to the supports 154, 156 such that the frame 158 is spaced away from the handle 79 by a predetermined distance that can permit an operator to extend a hand between the frame 158 and the handle 79. The right light strip 148 can include an outer end 160 and an inner end 162. The right light strip 148 can be mounted in and surrounded by the right frame 158.

The left housing 150 can include a left outer support 164, and left inner support 166 and a left frame 168 that extends from and is connected each of the supports 164, 166. The supports 164, 166 can be cantilevered to the handle 79 of the left control lever 30 and the frame 168 can extend from and be connected to the supports 164, 166 such that the frame 168 is spaced away from the handle 79 by a predetermined distance that can permit an operator to extend a hand between the frame 168 and the handle 79. The light strip 152 can include an outer end 170 and an inner end 172. The left light strip 152 can be mounted in and surrounded by the left frame 168.

Figure 8:
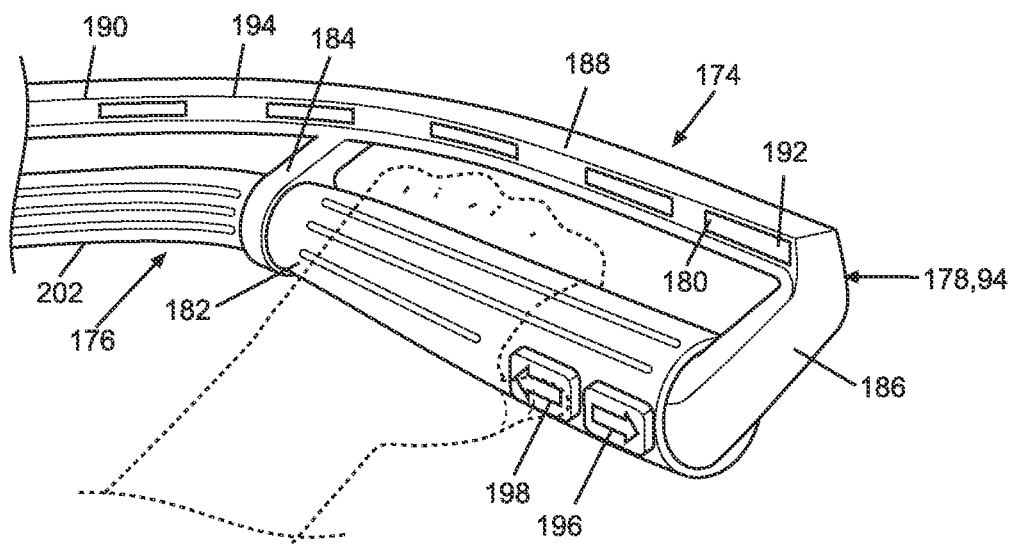
FIG. 8 is a perspective view of a portion of a left control handle and a second embodiment of a display system mounted on the left control lever.

FIG. 8 shows a second embodiment of the display device 94 that includes a left display assembly 174 that is mounted on a left control lever 176, where the left control lever 176 can be structured and operated in the manner described above with respect to the left control lever 30. The left display assembly 174 can include a left housing 178 and a left light strip 180. The housing 178 can support the light strip 180 on the lever 176. The light strip 180 can include a plurality of color light emitting diodes ("LEDs") distributed along the length of the light strip 180.

The left housing 178 can include a handle 182, an outer support 184, an inner support 186 and a frame 188 that extends from and is connected each of the supports 184, 186. The supports 184, 186 can be cantilevered to the handle 182 and the frame 188 can extend from and be connected to the supports 184, 186 such that the frame 188 is spaced away from the handle 182 by a predetermined distance that can permit an operator to extend a hand (shown in phantom) between the frame 188 and the handle 182. The light strip 180 can include an outer end 190 and an inner end 192.

The frame 188 can include a curved portion 194 that extends from the outer support 186 to the outer end 190. The curved portion 194 can follow along a curved portion 202 of the left control lever 176. The left display strip 180 can be mounted in the frame 188.

The display device 94 shown in FIG. 8 can also include a right display assembly that includes the structures of the left display assembly 174, except the right display assembly can be a mirror image of the left display assembly 174 and does not include the auto-turn switches 196, 198. The left control lever 176 and the mirror image right control handle can include all of the features and perform all of the operations described above with respect to the control levers 28, 30 of FIGS. 1-7.

Figure 9:
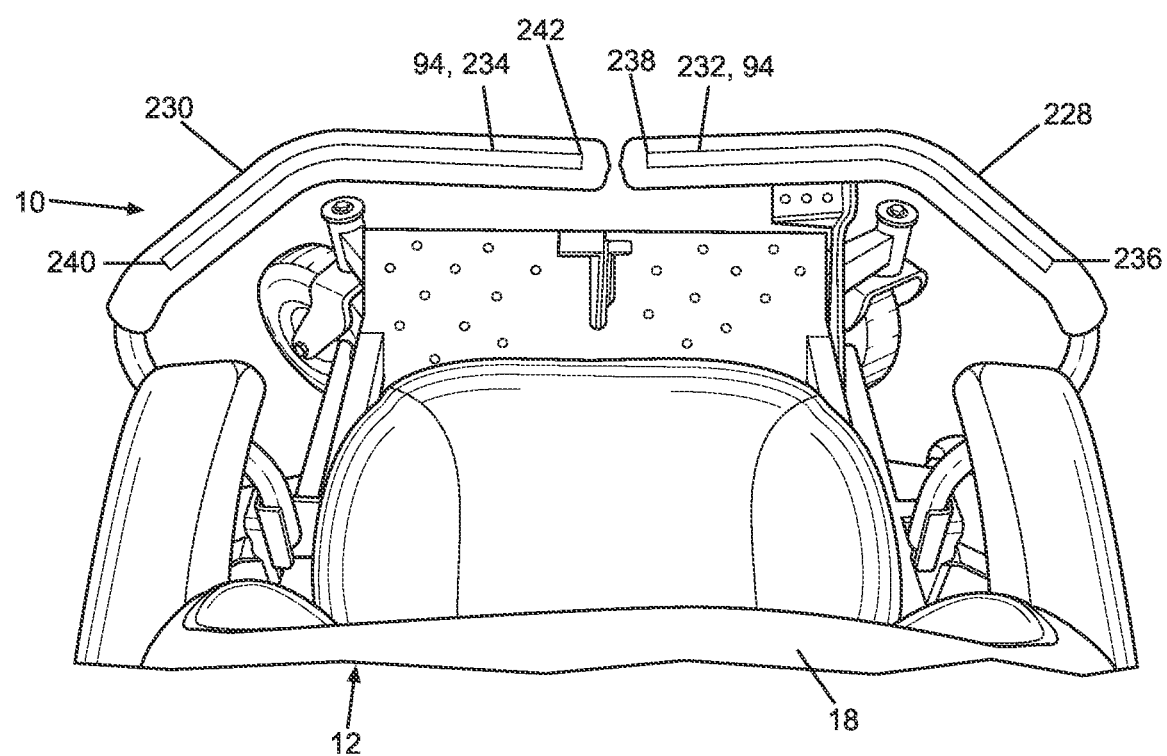
FIG. 9 is a top view of a portion of the lawnmower of FIG. 1 and shows a third embodiment of a display system mounted on the control levers.

Referring to FIG. 9, a third exemplary embodiment of the display device 94 can include light strips 232, 234 that are integrated directly into a right control lever 228 and a left control lever 230. The control levers 228, 230 of FIG. 9 can include all of the features and perform all of the operations described above with respect to the control levers 28, 30 of FIGS. 1-7. Each of the light strips 232, 234 can include a plurality of color light emitting diodes ("LEDs") distributed along the length of the light strips 232, 234. The right light strip 232 can include a right outer end 236 and a right inner end 238. The left light strip 234 can include a left outer end 240 and a left inner end 242.

Illumination control of the light strips 180, 232, 234 can be same as that for the light strips 148, 152. Connections within the display system 200 and operations of the light strips 180, 232, 234 will be described with reference to the light strips 148, 152.

Figure 10:
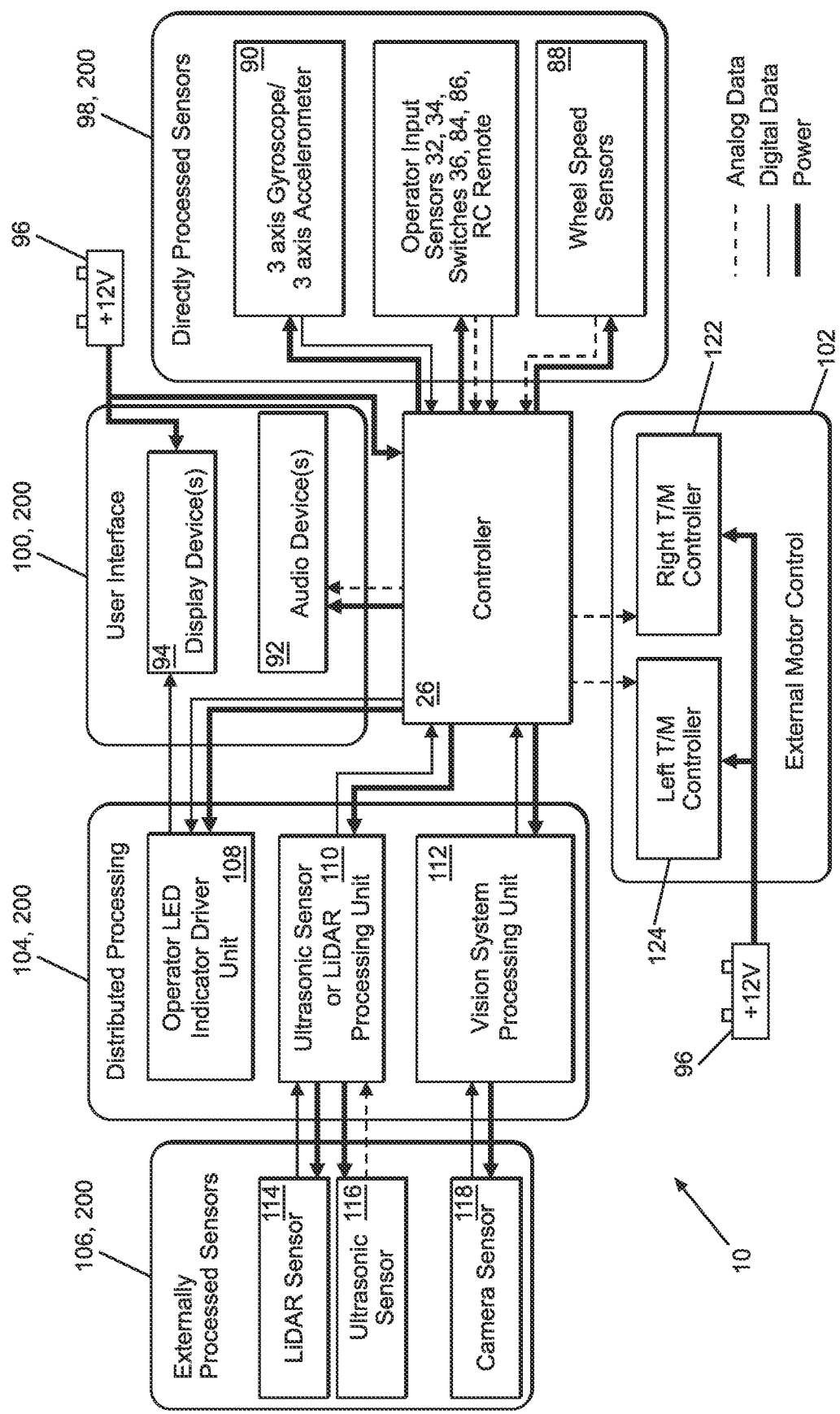
FIG. 10 is a schematic view showing the electrical power distribution and electrical signal communication for the drive-by-wire system of the lawnmower of FIG. 1.

FIG. 10 is a schematic view showing the electrical power distribution and electrical signal communication for the drive-by-wire system 10. The drive-by-wire system 10 can include at least one battery 96, a directly processed sensor array 98, a user interface 100, an external motor control system 102, a distributed processing system 104 and an externally processed sensor array 106. The display system 200 can be in electrical communication with the battery 96 and include the controller 26, the directly processed sensor array 98, the user interface 100, the distributed processing system 104 and the externally processed sensor array 106.

The external motor control system 112 can include a right HST controller 122 and a left HST controller 124. Instead of the controller 26 being directly connected to the actuator 70 as shown in FIG. 2, the controller 26 can send drive commands to the right HST controller 122 and to the left HST controller 124 that are based on the signals received from the sensors 32, 34. The controllers 122, 124 can be configured to signal the respective actuator 70 as described above with respect to FIGS. 1-8.

Although FIG. 10 appears to show two batteries 96, the battery 96 of FIG. 10 can be a single battery 96 with the second location of the battery 96 illustrated to simplify the electric power distribution paths between the battery 96 and each of the electric/electrical devices of the drive-by-wire system 10. However, alternate embodiments can include a second battery 96 that is dedicated to the external motor control system 102.

The controller 26 can be in electrical power communication with the battery 96. The controller 26 can distribute power from the battery 96 to each of the directly processed sensor array 98, at least one audio device 92 of the user interface 100, the distributed processing system 104 and the externally processed sensor array 106. The battery 96 can supply power directly to the external motor control system 102 and at least one display device 94 of the user interface 100.

The controller 26 can be in electrical signal communication directly with each of the directly processed sensor array 98, the audio device(s) 92, external motor control system 102 and the distributed processing system 104. The controller 26 can be in electrical communication indirectly with the display device(s) 94 and the externally process sensor array 106 by way of the distributed processing system 104. The electrical communication to and from the controller 26 can use analog signals or digital signals or a combination of analog signals and digital signals.

The directly processed sensor array 98 can include the sensors 32, 34, the mode selector 36, auto-turn switches 84, 86 (or auto-turn switches 196, 198 of FIG. 8), wheel speed sensors 88 and a dynamic sensor array 90. The wheel speed sensors 88 can send analog communication signal(s) to the controller 26 that are indicative of the rotational speed of the respective one of the drive wheels 20L, 20R. The dynamic sensor array 90 can send digital communication signal(s) to the controller 26 that are indicative of the dynamic acceleration(s) acting on the lawnmower 12 and the rotation rate(s) that the lawnmower 12 is experiencing. The sensors 32, 34 can send analog communication signals as described above, the mode selector 36 and the switches 84, 86 can send digital communication signals as described above, and the RC remote can send analog and/or digital communication signals as appropriate to achieve the desired performance of the lawnmower 12. The controller 26 can be configured to distribute electrical power from the battery to the sensors 32, 34, the mode selector 36, the switches 84, 86 (or switches 198, 198), the wheel speed sensors 88 and the sensor array 90.

The drive-by-wire system 10 can be configured to operate the lawnmower 12 at a remote distance from the lawnmower 12 that is within a predetermined range. The directly processed sensor array 98 can include a remote control unit (also referred to as an RC unit or as an RC remote) that is configured to mimic the signals of the sensors 32, 34, the mode selector 36 and the auto-turn switches 84, 86 (or the auto-turn switches 196, 198 of FIG. 8) so that the operator to control the lawnmower 12 from the remote distance. The remote control unit can be a feature of the directly processed sensor array.

The display system 200 can be configured to provide audible and/or visual information or messages to the operator of the lawnmower 12. The user interface 100 can include at least one audio device 92 and at least one display device 94 that can alert the operator of at least one predetermined operating condition of the lawnmower 12. The audio device 92 can include, but is not limited to, a speaker, a horn, and/or an alarm buzzer. The display device 94 can include, but is not limited to, at least one LED, a liquid crystal display screen, and/or a touch screen. The controller 26 can be configured to cause the audio device 92 to emit at least one audio message(s) and the display device 94 to display at least one visual message when the controller 26 is in the first mode or in the second mode. The controller 26 can be configured to transmit an analog communication signal directly to the audio device(s) 92.

The distributed processing system 104 can include an operator LED indicator driver unit 108. The controller 26 can be in electrical communication with the driver unit 108 such that the controller 26 can selectively supply power from the battery 96 to the driver unit 108 and send a display command signal to the driver unit 108. The controller 26 can be configured to determine the display command for the display device(s) 94 based on data the controller 26 receives from the directly processed sensor array 98. The controller 26 can be configured to send the display command signal as a digital communication signal to the driver unit 108.

The operator LED indicator driver unit 108 can be configured to process the display command signal received from the controller 26 and issue an appropriate one of an illumination signal and off signal to the display device 94. The illumination signal can be a digital communication signal. The controller 26 can be configured to send one of a plurality of different display command signals and the unit 108 can be configured to send one of a plurality of different illumination signals that correspond to the plurality of different display command signals, respectively.

It can be advantageous to provide visual messages, alone or in combination with audio messages, to the operator of the lawnmower 12 that can improve or enhance a safe and efficient operation of the lawnmower 12. For example, it can be advantageous to provide a visual message that can indicate a tilt condition of the lawnmower 12, or an obstacle condition in the path of the lawnmower 12, or a turn condition of the lawnmower 12. The controller 26 can be configured to determine an appropriate predetermined pattern from a plurality of predetermined patterns and to cause the display device 94 to present the appropriate predetermined pattern based on the drive signal(s) received from the directly processed sensors 98 and the distributed processing system 104. Each of the predetermined patterns can have a unique shape, unique size, and/or unique color, and can be a static pattern that does not change is size shape or location or a dynamic pattern that changes in at least one of a size, shape and location.

Figure 11:
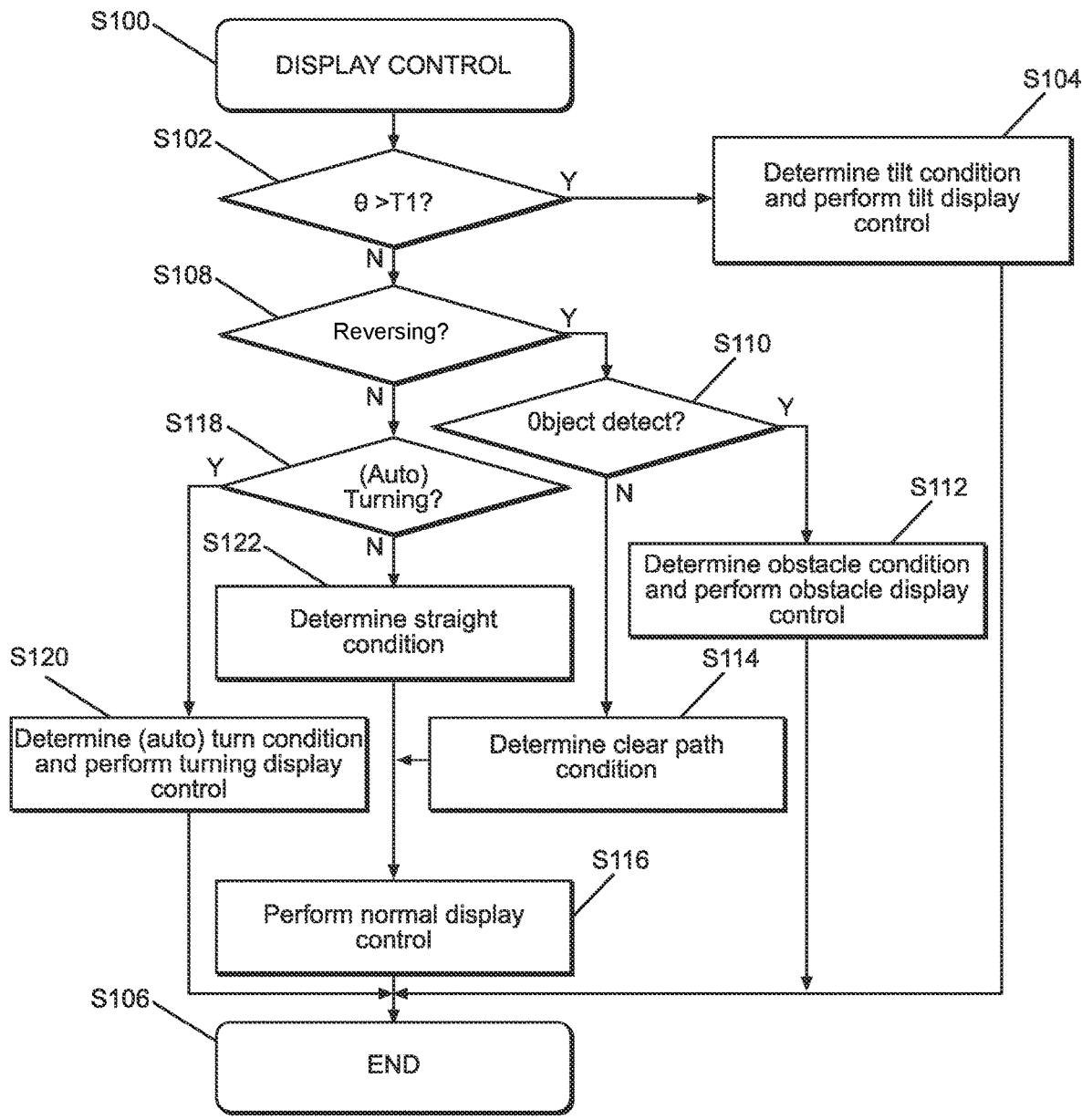
FIG. 11 is a flowchart that depicts an algorithm that can be executed by a controller a display system of the lawnmower of FIG. 1 to manipulate at least one display device of the display system.
Figure 12:
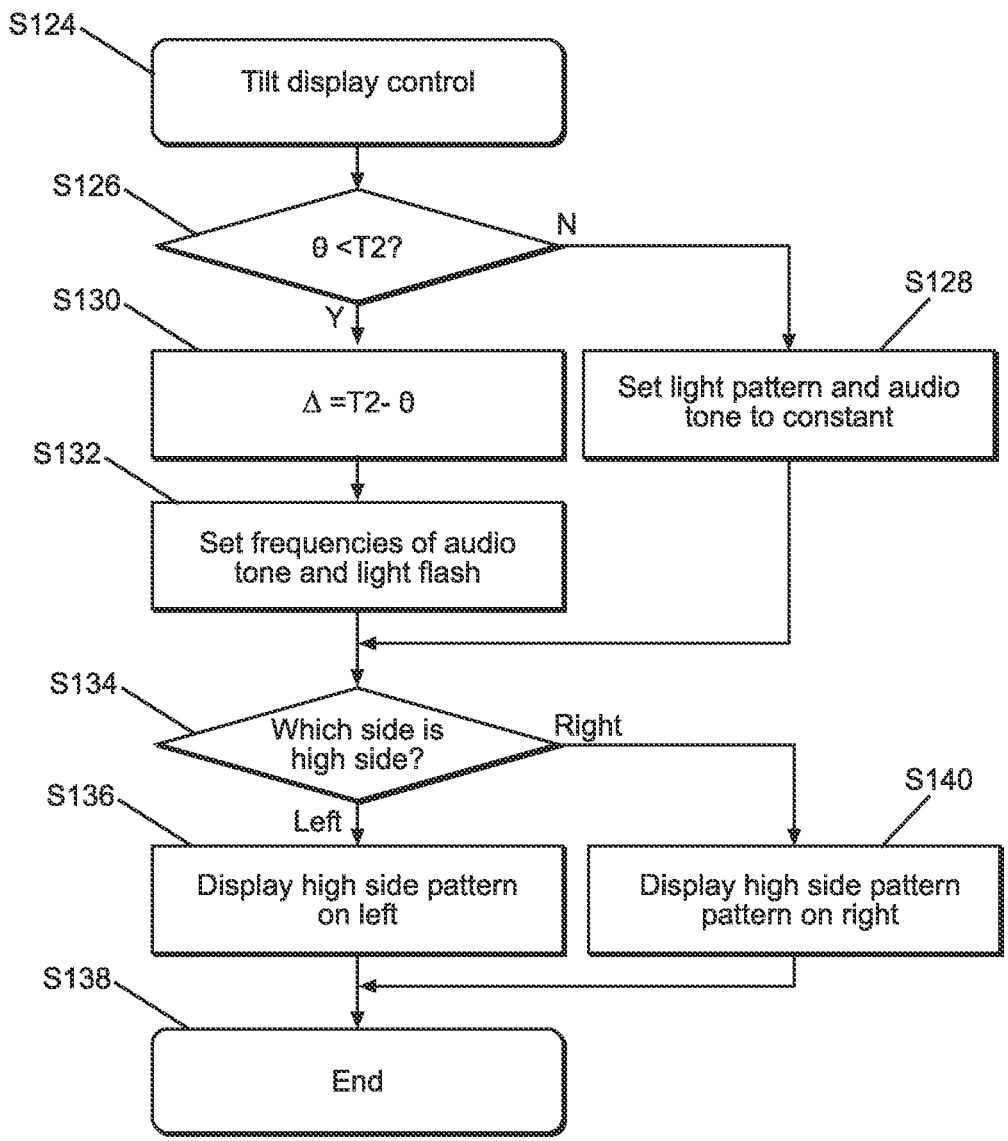
FIG. 12 is a flowchart that depicts a tilt display control subroutine of the flowchart of FIG. 1.
Figure 13:
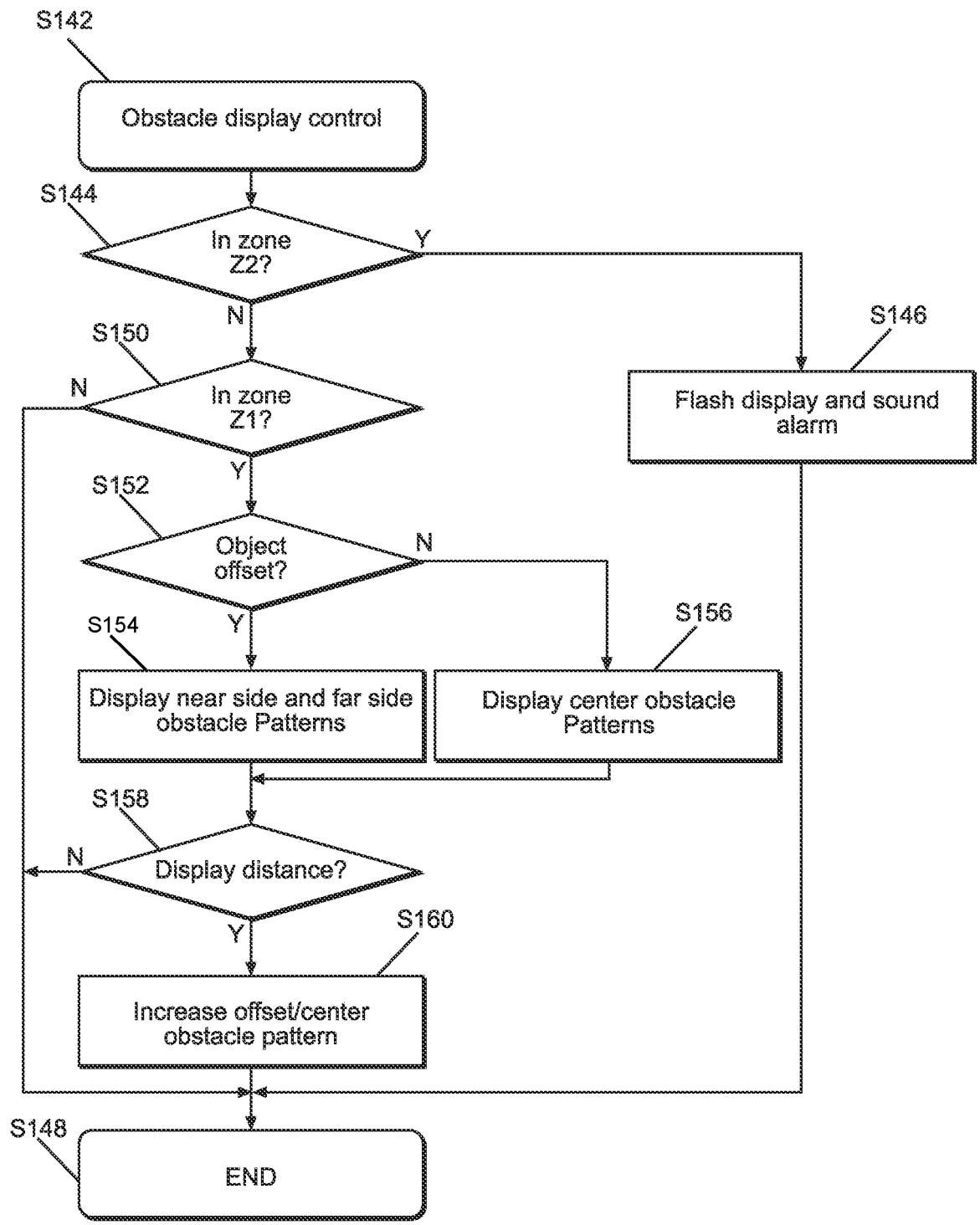
FIG. 13 is a flowchart that depicts an obstacle display control subroutine of the flowchart of FIG. 1.
Figure 14:
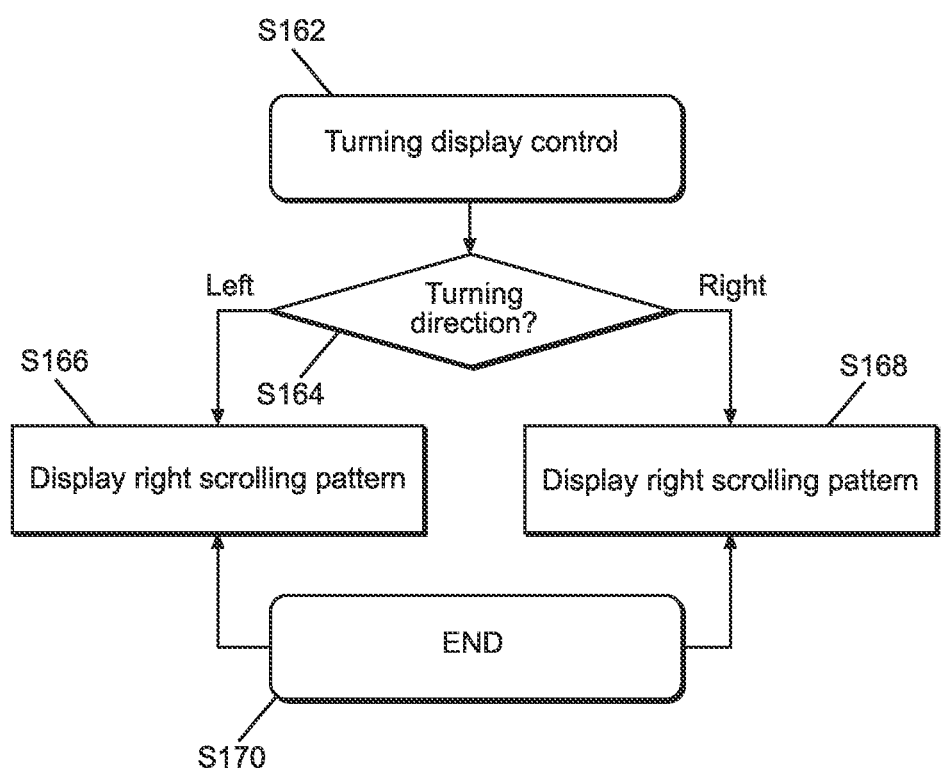
FIG. 14 is a flowchart that depicts a turning display control subroutine of the flowchart of FIG. 1.

FIG. 11 illustrates an exemplary display control algorithm that the controller 26 can follow to control the operation of the display device 94 based on the current operating condition of the lawnmower. FIGS. 12-14 illustrate exemplary subroutines of the algorithm of FIG. 11. The controller 26 can be configured to start the display control algorithm at step S100 and subsequently move to step S102.

Figure 15:
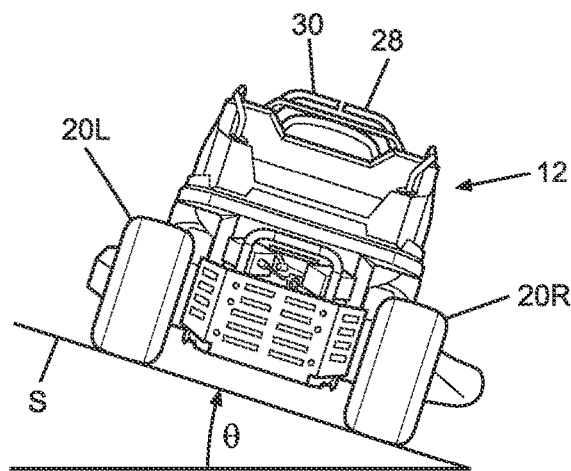
FIG. 15 is a rear view of the lawnmower of FIG. 1 while being driven on inclined surface.

Referring to FIG. 15, the lawnmower 12 can be operated on uneven terrain, including along an inclined surface S that is inclined at a tilt angle θ with respect to horizontal. At step S102, the controller 26 can be configured to determine the tilt angle θ from data received from the dynamic sensor array 90 and compare the tilt angle θ with a predetermined first warning threshold T1. If the controller 26 determines that the tilt angle θ is greater than the first warning threshold T1, then the controller 26 can be configured to proceed to step S104 where the controller 26 can determine a tilt condition presently exists for the lawnmower 12 and perform a tilt display control of the display device 94 according to the tilt display control subroutine of FIG. 12. Upon executing the tilt display control subroutine, the controller 26 can be configured to proceed to step S106 and exit the display control algorithm.

If the controller determines at step S102 that the tilt angle θ is less than or equal to the first warning threshold T1, then the tilt angle θ of the lawnmower 12 can be considered to be within a desired range for operation of the lawnmower 12 and the controller 26 can proceed to step S108 to determine whether another one of the plurality of predetermined patterns (also referred to as display messages) might be appropriate for the current operational condition of the lawnmower 12.

Returning to FIG. 10, the drive-by-wire system 10 can include an obstacle detection and avoidance system. The obstacle detection and avoidance system can operate in the first mode and in the second mode of the drive-by-wire system 10 described above with respect to FIGS. 3-7. The obstacle detection and avoidance system can include the controller 26, the externally processed sensor array 106 and the distributed processing system 104. At step S108, the controller 26 can be configured to initiate processing that determines whether an obstacle is presently in or near a reverse travel path of the lawnmower 12. The controller 26 can be configured to determine whether the lawnmower 12 is traveling in a reverse direction using the signals received from the sensors 32, 34, as described above with respect to FIGS. 3-7. If the controller 26 determines that the lawnmower 12 is presently traveling in the reverse direction, the controller 26 can proceed to step S110 to determine whether an obstacle is present within a predetermined area of the lawnmower 12.

Returning to FIG. 10, the distributed processing system 104 can include an ultrasonic/LiDAR processing unit 110 and a vision system processing unit 112, and the externally processed sensor array 106 can include a LiDAR sensor 114, an ultrasonic sensor 116 and a camera sensor 118. In an alternate embodiment, the distributed processing system 104 can include a RADAR sensor and processing unit in place of one or both of the units 110, 112 or in addition to both units 110, 112. The distributed processing system 104 can be configured to process the data received from the externally processed sensor array 106 and output one or more signals to the controller 26. The controller 26 can be configured to determine whether an obstacle is present in or near the path of travel of the lawnmower 12 based on the signal(s) received from the distributed processing system 104.

If the controller 26 determines that an obstacle presently exists in or near the reverse travel path of the lawnmower 12 at step S110, the controller 26 can be configured to proceed to step S112 where the controller 26 can determine an obstacle condition presently exists for the lawnmower 12 and perform an obstacle display control subroutine. The obstacle display control subroutine will be discussed with reference to FIG. 13. After executing the obstacle display control subroutine, the controller 26 can proceed to step S106 and exit the display control algorithm.

If the controller 26 determines that no obstacle presently exists in or near the reverse travel path of the lawnmower 12, then the controller 26 can proceed to step S114. At step S114, the controller 26 can be configured to determine a clear path condition and proceed to step S116.

At step S116, the controller 26 can be configured to perform a normal display control subroutine. The normal display control subroutine can display any appropriate predetermined pattern that indicates to the operator that the lawnmower 12 is operating in a manner that does not merit special attention by the operator. The predetermined pattern of the normal display control subroutine can include a predetermined pattern, such as but not limited to, a static illumination of one or more of the LEDs of the display device 94, and a predetermined color, such as but not limited to, white. The controller 26 can be configured to signal the operator LED indicator driver unit 108 to cause the display devices(s) 94 to display the predetermined pattern in accordance with the normal display control. Alternate embodiments can turn off the display device 94 or illuminate a static green-colored pattern.

After executing the normal display control, the controller 26 can proceed to step S106 and exit the display control algorithm.

If the controller 26 determines at step S108 that the lawnmower 12 is not traveling in a reverse path, the controller 26 can be configured to proceed to step S118. At step S118, the controller 26 can determine whether the lawnmower 12 is turning, either by manual control performed by the operator or by an automated turning operation performed by the controller 26.

If the controller 26 determines at step S118 that the lawnmower 12 is turning, then the controller 26 can be configured to proceed to step S120. At step S120, the controller 26 can be configured to determine that a turn condition or an automated turn condition presently exists for the lawnmower 12 and can perform a turn display control. A turn display control subroutine will be described with respect to FIG. 14. After executing the turn display control subroutine, the controller 26 can be configured to proceed to step S106 and exit the display control algorithm.

If the controller determines at step S118 that the lawnmower 12 is not turning, the controller 26 can proceed to step S122. At step S122, the controller 26 can be configured to determine that a straight condition presently exits for the lawnmower 12. The controller 26 can be configured to proceed from step S122 to step S116 and perform the normal display control subroutine as described above. Upon execution of the normal display control, the controller 26 can be configured to proceed to step S106 and exit the display control algorithm.

FIG. 12 shows a flowchart that depicts an exemplary tilt display control subroutine that can be executed by the controller 26 for operating the display device 94 to express a tilt warning pattern to the operator of the lawnmower 12. The tilt warning pattern can be indicative of the lawnmower's 12 tilt attitude relative to horizontal. During the execution of step S104 of FIG. 11, the controller 26 can initiate the tilt display control subroutine at step S124 of FIG. 12. The controller 26 can be configured to move from step S124 to step S126.

The display system 200 can be configured to display the tilt warning pattern for a predetermined range of tilt angles θ in an effort to provide the operator with reasonable and useful notice of a particular tilt condition of the lawnmower 12 so that the operator can take appropriate measure(s) to change the tilt angle θ of the lawnmower 12. For example, the operator LED indicator driver unit 108 can be configured to signal the display 94 to illuminate a predetermined color, such as but not limited to red, and in a predetermined pattern, such as but not limited to a flashing pattern. The tilt warning pattern can include a low side pattern and a high side pattern that is different from the low side pattern. In exemplary embodiments, the high side pattern can be larger in area than the low side pattern, and/or a brightness that is greater than the brightness of the low side pattern, and/or a darker shade of the predetermined color as compared to the low side pattern.

The display system 200 can be configured to vary the tilt warning pattern based on the current tilt angle θ of the lawnmower 12. For example, the flashing pattern can increase in frequency as the tilt angle θ approaches a second warning threshold T2 and decrease in frequency as the tilt angle θ decreases relative to the second warning threshold T2. The controller 26 can be configured to generate an audio command that causes the audio device 92 to emit a sound pulse at increasing frequencies and decreasing frequencies in accordance with the corresponding increasing flashing frequency and decreasing flashing frequency. The controller 26 can be configured to signal the audio device 92 to emit a continuous sound when the tilt angle θ is equal to or greater than the second warning threshold T2.

At step S126, the controller 26 can be configured to compare the tilt angle θ to the predetermined second warning threshold T2, where second warning threshold T2 is greater than the first warning threshold T1. If the controller 26 determines that the tilt angle θ is greater than or equal to the second warning threshold T2, then the controller 26 can proceed to step S128.

The second warning threshold T2 can be set an any appropriate value that can indicate a limit of desirable operation of the lawnmower 12 on the inclined surface S. When the tilt angle θ is greater than or equal to the second warning threshold T2, the controller 26 can be configured to set up a display command that will cause the display device 94 to present a constant light pattern that does not flash and an audio command that will cause the audio device 92 to emit a constant tone. The controller 26 can be configured to move from step S128 to step S134.

If the controller 26 determines at step S126, that the tilt angle θ is less than the second warning threshold T2, then the controller 26 can proceed to step S130.

At step S130, the controller 26 can be configured to determine the value of a difference Δ between the second warning threshold T2 and the tilt angle θ. The difference Δ can be used to determine the flash frequency for the light pattern and the pulse frequency for the audio tone. For example, the controller 26 can be configured to access a look-up table that pairs individual values of the difference Δ (or a predetermined range of values of the difference A) with a corresponding pulse frequency for each of the light pattern and the audio tone. Alternate embodiments can include a controller 26 that is configured to calculate a pulse frequency for the light pattern and the audio tone based on one or more predetermined equations in which the difference Δ is a variable. Subsequently, the controller 26 can proceed to step S132.

At step S134, the controller 26 can be configured to determine which side of the lawnmower 12 is the high side. The controller 26 can be configured to process the data from the dynamic sensor array 90 in any appropriate manner in order to determine the direction and magnitude of the tilt angle θ of the lawnmower 12.

If the controller 26 determines that the tilt angle θ of the lawnmower 12 indicates that the left side of the lawnmower 12 is the high side, then the controller 26 can proceed to step S136. At step S136, the controller 26 can be configured to prepare and send a display command signal to the operator LED indicator driver unit 108 that the left side of the lawnmower 12 is the high side. The operator LED indicator driver unit 108 can, in turn, send a command to the display device 94 to cause the display device 94 to display the high side pattern on the left light strip 152 and the low side pattern on the right light strip 148. Then, the controller 26 can proceed to step S138 and end the tilt display control subroutine.

If the controller 26 determines at step S134 that the tilt angle θ of the lawnmower 12 indicates that the right side of the lawnmower 12 is the high side, then the controller 26 can proceed to step S140. At step S140, the controller 26 can be configured to prepare and send a display command signal to the operator LED indicator driver unit 108 requesting a high side pattern for the right light strip 148 and the low side pattern for the left light strip 152. The operator LED indicator driver unit 108 can, in turn, send a command to the display device 90 to cause the display device 94 to display the high side pattern on the right light strip 148 and the low side pattern on the left light strip 152. Then, the controller 26 can proceed to step S138 and end the tilt display control subroutine.

The display system 200 can be configured to determine whether an object is in or near a path of travel of the lawnmower 12 when the lawnmower is traveling in a reverse direction and notify the operator of the presence or absence of an object near or in the reverse path of travel. The controller 26 can be configured to limit the travel speed of the lawnmower 12, signal the HSTs 56L, 56R to reduce the travel speed of the lawnmower 12, or signal the HSTs 56L, 56R to stop the travel of the lawnmower 10 based on signals the controller 26 receives from the ultrasonic/LiDAR processing unit 110 and the vision system processing unit 112. The controller 26 can be configured to send an audio command to the audio device 92 and a display command to the operator LED indicator driver unit 108 based on the signals the controller 26 receives from the ultrasonic/LiDAR processing unit 110 and the vision system processing unit 112 to cause the audios device 92 to emit a predetermined audio message and the display device 94 to illuminate with a predetermined color and a predetermined pattern in accordance with the obstacle display control subroutine shown in FIG. 13. The controller 26 can be in electrical communication with the ultrasonic/LiDAR processing unit 110 and the vision system processing unit 112 such that the controller 26 can selectively supply power from the battery 96 to the units 110, 112 and receive a first object location signal and a second object location signal from the units 110, 112, respectively.

Figure 16:
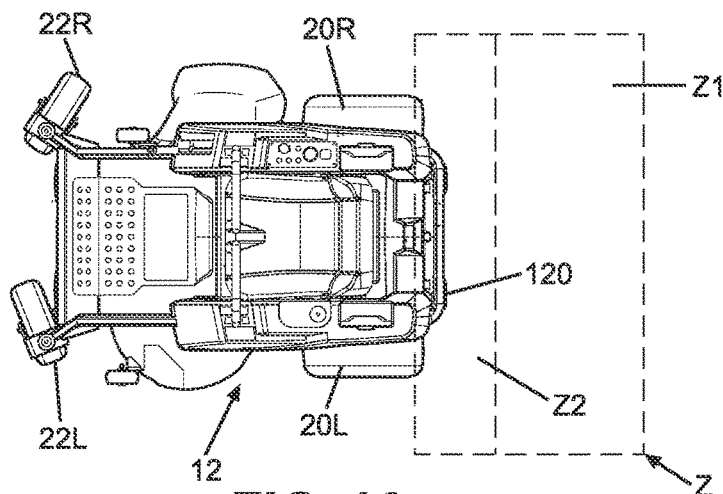
FIG. 16 is an overhead view of the lawnmower of FIG. 1 and shows a default obstacle detection zone.
Figure 17:
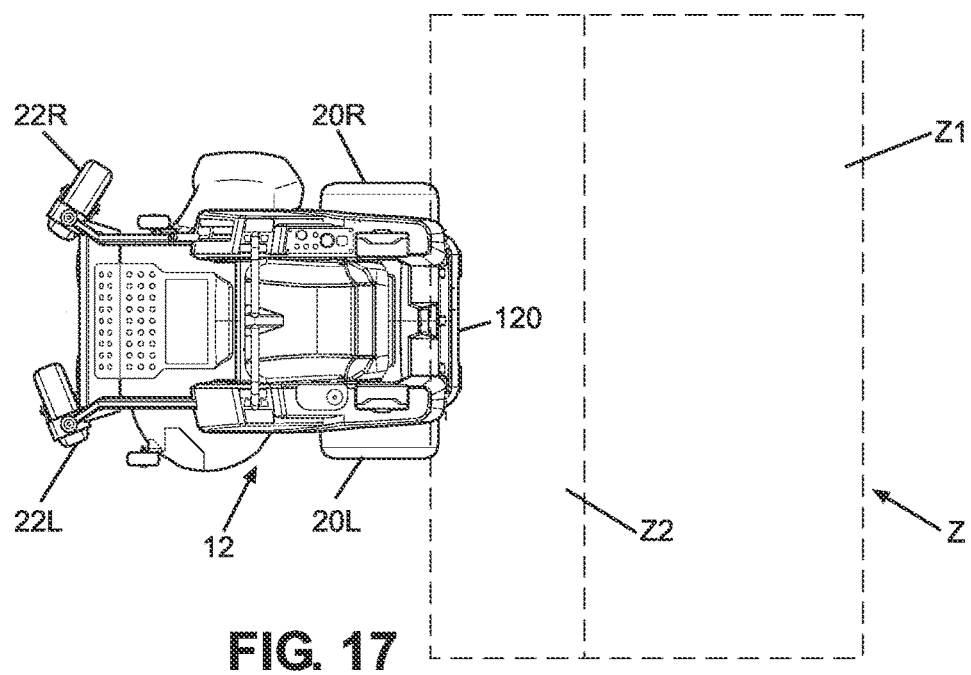
FIG. 17 an overhead view of the lawnmower of FIG. 1 and an enlarged obstacle detection zone.

Referring to FIGS. 16 and 17, the sensors 114, 116, 118 can be mounted at different locations on the rear end 120 of the lawnmower 12. The LiDAR sensor 114 and/or the ultrasonic sensor 116 can be configured to scan a predetermined scan two-dimensional plane that extends outwardly from the rear end 120 of the lawnmower 12 and is spaced above ground level by a predetermined distance. The scan plane can include at least a predetermined detection zone Z that extends out from the rear end 120 of the lawnmower 12. The LiDAR sensor 114 and the ultrasonic sensor 116 can be configured to send a first data signal and a second data signal, respectively, that can include information that is indicative of the physical location of one or more objects located in the field of view of the sensors 114, 116. For example, the first data signal from the LiDAR sensor 114 can include data in a polar format (angle and radius). The first data signal and the second data signal can be configured as a point array or a data array.

The LiDAR sensor 114 and the ultrasonic sensor 116 can be in electrical communication with the ultrasonic/LiDAR processing unit 110 such that the ultrasonic/LiDAR processing unit 110 can selectively supply power from the controller 26 to the LiDAR sensor 114 and ultrasonic sensor 116, the LiDAR sensor 114 can send the first image signal to the ultrasonic/LiDAR processing unit 110, and the ultrasonic sensor 116 can send the second image signal to the ultrasonic/LiDAR processing unit 110. The first image signal can be a digital communication signal and the second image signal can be analog communication signal.

The ultrasonic/LiDAR processing unit 110 can be configured to determine a first detection command based on the first image signal and send the first detection signal to the controller 26. The vision system processing unit 112 can be configured to determine a second detection signal based on the second image signal and send the second detection signal to the controller 26. The first and second detection signals can be digital communication signals. The first detection signal and the second detection signal can include data that is indicative of the location of any object(s) detected in the field of view of the sensors 114, 116.

The controller 26 can be configured to determine a reverse travel state of the lawnmower 12 when the first and second direction signals indicate that at least the right control lever 28 is in the second range R2 as described above with respect to FIGS. 5 and 6. The controller 26 can be configured to supply power to the ultrasonic sensor/LiDAR processing unit 110 and the vision system processing unit 112 when the controller 26 determines the reverse travel state and terminate the supply of power to the units 110, 112 when the controller 26 determines that the lawnmower 12 is not in the reverse travel state.

The controller 26 can be configured to divide the detection zone Z into a predetermined warning zone Z1 and predetermined stop zone Z2. The controller 26 can be configured to determine whether the location data included with the first detection signal or the second detection signal lies within the warning zone Z1 or the stop zone Z2. If the controller 26 determines that the first detection signal or the second detection signal includes location data that lies within the warning zone Z1, the controller 26 can be configured to reduce a maximum speed limit for the HSTs 56L, 56R and/or send a drive signal to the HSTs 56L, 56R that causes the HSTs 56L, 56R to reduce their drive speed. If the controller determines that the first detection signal or the second detection signal includes location data that lies within the stop zone Z2, the controller 26 can be configured to ignore any movement of the control levers 28, 32 in the second region R2 by the operator and signal the HSTs 56L, 56R to stop the lawnmower 12.

Although FIGS. 16 and 17 show the zones Z, Z1, Z2 as having a rectangular shape, exemplary embodiments can include zones Z, Z1, Z2 that have a semicircular shape, or square shape, or other shape, where the warning zone Z1 and the stop zone Z2 have a width that corresponds to the width of the lawnmower 12 measured at the drive wheels 20L, 20R. The square or rectangular shape for the zones Z, Z1, Z2 can be advantageous when the lawnmower 12 travels in a reverse direction next to a building or house. The lateral edges of the zones Z, Z1, Z2 can extend parallel or substantially parallel to the exterior of the building or house. Thus, the exterior of the building or house can be outside of the zones Z, Z1, Z2 and a false obstacle detection caused by the building or house can be avoided.

The directly processed sensor array 98 of the drive-by-wire system 10 can include an operator input that can allow the operator of the lawnmower to adjust the boundary of the zones Z1, Z2. For example, the operator input can permit the operator of the lawnmower 12 to toggle between the rectangular shape of the zones Z1, Z2 sons in FIGS. 16 and 17 and the semi-circular shape of the zones Z1, Z2 described above. As another example, the operator input can permit the operator of the lawnmower 12 to change the width and/or the length (or radius and arclength) of the zones Z1, Z2.

Comparing FIGS. 16 and 17, the controller 26 can be configured to adjust the size of the warning zone Z1 and the stop zone Z2 based on the second detection signal received from the vision system processing unit 112. The zones Z1, Z2 of FIG. 17 are bigger than the zones Z1, Z2 of FIG. 16. The second detection signal can include information that is indicative of the presence of predetermined object such as but not limited to a human. The controller 26 can be configured to compare the location data to the larger zones Z1, Z2 shown FIG. 17 when the second detection signal includes information that is indicative of the presence of the predetermined object. The controller 26 can be configured to compare the location data to the smaller warning zone Z1 and the stop zone Z2 shown in FIG. 16 when the second detection signal does not include information that is indicative of the presence of the predetermined object.

The controller 26 can send an audio command to the audio device 92 and/or a display command to the operator LED indicator driver unit 108 when the controller 26 determines that the first detection signal or the second detection signal includes location data that lies within the warning zone Z1. FIG. 13 shows a flowchart that depicts an exemplary obstacle display control subroutine that can be executed by the controller 26 for operating the display device(s) 94 to express an obstacle warning pattern to the operator of the lawnmower 12. The obstacle warning pattern can be indicative of on object in or near the path of travel of the lawnmower's 12 when the lawnmower 12 is traveling in the reverse direction. During the execution of step S112 of FIG. 11, the controller 26 can initiate the obstacle display control subroutine at step S142 of FIG. 13. The controller 26 can be configured to move from step S142 to step S144.

At step S144, the controller 26 can be configured to determine whether there is an object in the stop zone Z2 based on the signals the controller 26 receives from the distributed processing array 104. If the controller 26 determines that there is an object in the stop zone Z2, then the controller 26 can proceed to step S146.

At step 146, the controller 26 can be configured to set up a display command for the operator LED indicator driver unit 108 that instructs the operator LED indicator driver unit 108 to flash at a predetermined frequency the display device 94 in a predetermined color such as, but not limited to, yellow. The controller 26 can be configured to move from step S146 to step S148 and exit the obstacle display control subroutine.

If the controller 26 determines at step S144 that an object is not present in the stop zone Z2, the controller 26 can be configured to move to step S150. At step S150, the controller 26 can be configured to determine whether there is an object in the warning zone Z1 based on the signals the controller 26 receives from the distributed processing array 104. If the controller 26 determines that there is an object in the warning zone Z1, then the controller 26 proceed to step S152.

At step 152, the controller 26 can be configured to determine whether the object that has been detected in the warning zone Z1 is offset relative to the path of travel of the lawnmower 12 or located directly in the path of travel of the lawnmower 12. For example, if the detected object is in the path of travel of both of the rear wheels 20L, 20R or located between the paths of both of the rear wheels 20L, 20R, then the objected can be described as a centered object. If the detected object is in or near the path of travel of one of the rear wheels 20L, 20R but not in or near the path of travel of the other one of the rear wheels (20L, 20R, then the detected object can be described as an offset object. The detected object also can be described as an offset object if the object is outside the path of travel of both of the rear wheels 20L, 20R and still within the detection zone Z if the detection zone Z is wider than the track of the rear wheels 20L, 20R.

The controller 26 can be configured to determine whether the detected object is a centered object or an offset object based on the signals the controller 26 receives from the distributed processing system 104. If the controller 26 determines that the detected object is an offset object, the controller 26 can move to step S154. If the controller 26 determines that the detected object is a centered object, the controller 26 can move to step S156.

At step 154, the controller 26 can be configured determine an offset condition and set up a display command for the operator LED indicator driver unit 108 that instructs the operator LED indicator driver unit 108 to cause the display device 94 to display a near side obstacle pattern and a far side obstacle pattern that is different from the near side obstacle pattern. For example, the near side pattern can have a size that is larger than a corresponding size of the far side. The size can be measured as an area, a length, a width, or a diameter.

The controller 26 can be configured to determine which side of the lawnmower 12 is the near side and which side is the far side in any appropriate manner based on the signals received from the distributed processing system 104. For example, the controller 26 can be configured to determine whether the detected object is closer to the left rear wheel 20L or the right rear wheel 20R. The near side can correspond to the closer of the two rear wheels 20L, 20R and the far side can correspond to the farther of the rear wheels 20L, 20R. If the controller 26 determines that the left side is the near side, the controller 26 can be configured to signal the operator LED indicator driver unit 108 to cause the left light strip 152 to display the near side obstacle pattern and the right light strip 148 to display the far side obstacle pattern. If the controller 26 determines that the right side is the near side, the controller 26 can be configured to signal the operator LED indicator driver unit 108 to cause the right light strip 148 to display the near side obstacle pattern and left light strip 152 to display the far side obstacle pattern.

At step S156, the controller can be configured to signal the operator LED indicator driver unit 108 to cause the light strips 148, 152 to display identical obstacle warning patterns that are equal in size and at the same position on the light strips 148, 152.

From step S154 or step S156, the controller 26 can be configured to move to step S158.

The controller 26 can be configured to signal the operator LED indicator driver unit 108 to adjust the size of the obstacle warning pattern as the distance to the detected object changes. At step S158, the controller 26 can be configured to save each measured distance to the detected object in an appropriate electronic storage device or medium such as, but not limited to, RAM or an external storage device and compare the previous distance to the current distance between the lawnmower 12 and the detected object. The controller 26 can be configured to move from step S158 to step S160.

At step S160, the controller 26 can be configured to adjust the size of the obstacle warning pattern based on a change in the distance to the detected object. The controller 26 can be configured to signal the operator LED indicator driver unit 108 to cause the display devices 94 to increase the size of the obstacle warning pattern if the controller 26 determines that the lawnmower 12 is moving closer to the object and decrease the size of the obstacle pattern if the lawnmower 12 is moving farther from the detected object. The controller 26 can be configured to move from step S158 to step S148 and exit the obstacle display control subroutine.

As described above, an operator of the lawnmower 12 can manually steer the lawnmower 12 by manipulating the control levers 28, 30, 176, 228, 230 according to the first mode or the second mode of the drive-by-wire system 10. The operator can cause the controller 26 to perform the automated turning operation by applying an input to one of the auto-turn switches 84, 86, 196, 198. The controller 26 can be configured to cause the display device 94 to present a scrolling pattern in accordance with the turning display control subroutine of FIG. 14 when the operator manually turns the lawnmower 12 or engages the automated turn operation via one of the auto-turn switches 84, 86, 196, 198.

Referring to FIG. 7, the drive by wire system 10 can include the right auto-turn switch 84 and the left auto-turn switch 86 that can signal the controller 26 to execute an automated turning operation of the lawnmower 12 that can steer the lawnmower through a predetermined range of motion. The auto-turn switches 84, 86 can be mounted on the inner support 172 and the left light strip 152. In the alternate embodiment of FIG. 8, the auto-turn switches 196, 198 can be mounted on the handle 182. The auto-turn switches 196, 198 can have the structures and functions described with respect to the auto-turn switches 84, 86.

The controller 26 can be configured to select one of a left scrolling pattern and a right scrolling pattern when the operator manually steers the lawnmower 12 to the left or right, respectively, or inputs a request for an automated turn to the left or the right, respectively. During a manual turn, the controller 26 can use the data from the sensors 32, 34 in the manner described above with respect to steering the lawnmower 12 to select the appropriate one of the left scrolling pattern and the right scrolling pattern. During the automated turning operation, the controller 26 can be configured to select the appropriate one of the left scrolling pattern and the right scrolling pattern based on the signals received from the switches 84, 86. FIG. 14 shows a flowchart that depicts an exemplary turning display control subroutine that can be executed by the controller 26 for operating the display device(s) 94 to express a scrolling display pattern to the operator of the lawnmower 12. The scrolling warning pattern can be indicative of the turning direction (left/counterclockwise or right/clockwise) of the lawnmower's 12.

The switches 84, 86 can be in electrical communication with the controller 26 and can be configured to transmit a respective turn direction signal to the controller 26 in response to an input by the operator of the lawnmower 12. Each of the switches 84, 86 can be any appropriate switch such as but not limited to a push button, a touch sensor, or an icon on a touch screen. The switches 84, 86 can be located at any appropriate position on the left control lever 30 that can permit easy access by the operator and convenient use of the left control handle 30 without inadvertent actuation of either of the switches 84, 86. FIG. 7 shows the switches 84, 86 mounted in the left inner support 166. FIG. 8 shows switches 196, 198 mounted on the handle 182 of the left control lever 176. The switches 196, 198 can operate in the same manner as the switches 84, 86.

The first mode and the second mode of the drive-by-wire system 10 can include an automated turning operation that can allow the operator to instruct the controller 26 to drive the HSTs 56L, 56R so that the lawnmower 12 performs a predetermined change of direction. For example, in response to an operator input when the lawnmower 12 is traveling along a path P1 in a first direction indicated by arrow A in FIG. 18, the controller 26 can drive the HSTs 56L, 56R so that the lawnmower 12 follows either a right turn path or a left turn path and travels along a new path P2, or new path P3, that is adjacent to the previous path P1 and in a direction that is opposite to the direction indicated by arrow A.

The driver unit 108 can be configured to cause the light strips 148, 152 to illuminate the LEDs in a predetermined manner that can be readily recognized by the operator as an indication of the turning direction of the lawnmower 12. For example, the driver unit 108 can be configured to signal the right light strip 148 in combination with the left light strip 152 to illuminate in a predetermined color, such as but not limited to blue, and in a predetermined pattern, such as but not limited to an increased intensity blue portion that scrolls across the light strip 148, 152 from end to the other end over a lesser intensity blue background.

The controller 26 can be configured to cause illumination of the light strips 148, 152 via commands issued to the operator LED indicator driver unit 108 such that a pattern that is smaller than a length of the light strip 148, 152 starts at one end of the light strip 148, 152 travels across the light strip 148, 152 and ends at the other end of the light strip 148, 152. Alternate embodiments can include the controller 26 configured to signal the light strips 148, 152 to scroll a respective pattern in a synchronized manner.

The controller 26 can be configured to perform the automated turning operation in the first mode and the second mode. When performing the automated turn operation, the controller 26 can be configured to determine the speed of each of the HSTs 56L, 56R based on the position of the right control lever 28 in the first range R1 and whether the controller 26 receives a turn direction signal from the right auto-turn switch 84 or the left auto-turn switch 86. The controller 26 can be configured to determine the right HST 56R is the inside motor and the left HST 56L is the outside motor when the controller 26 receives a turn direction signal from the right auto-turn switch 84 and determine the left HST 56L is the inside motor and the right wheel 20R is the outside motor when the controller 26 receives a turn direction signal from the left auto-turn switch 86. The controller 26 can be configured to determine an outside drive speed that directly corresponds to the speed signal from the right sensor 32 and drive the outside motor at the outside drive speed. The controller 26 can be configured to determine an inside drive speed that is less than the outside drive speed and drive the inside motor at the inside drive speed until the lawnmower 12 travels a predetermined arcuate path.

Referring to FIG. 10, the wheel speed sensors 88 and the dynamic sensor array 90 can be in electrical communication with the controller 26. The dynamic sensor array 90 can include a three-axis gyroscope and a three-axis accelerometer.

Figure 18:
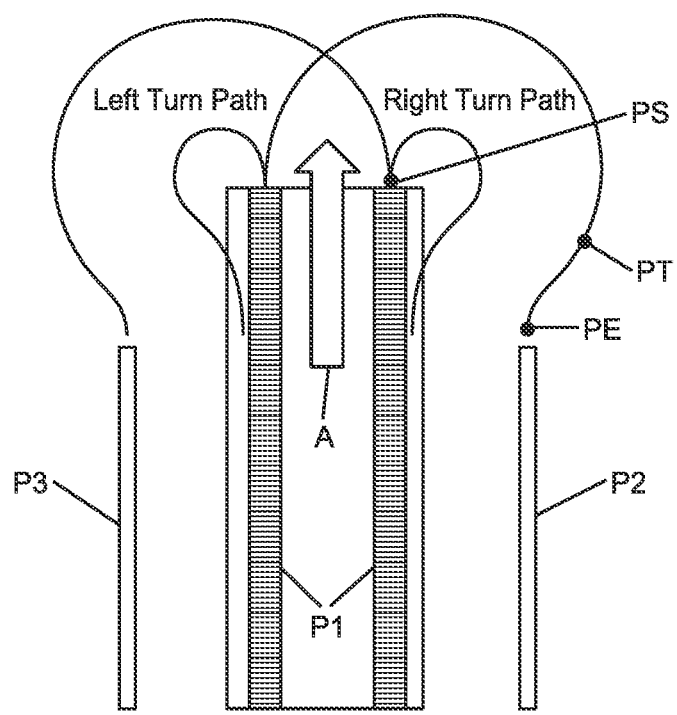
FIG. 18 is an overhead view of a travel path of the lawnmower of FIG. 1 when the operator inputs are used in the second mode.

FIG. 18 shows a travel path of the lawnmower 12 when the controller 26 executes an automated turn to the right. The controller 26 can be configured to determine a current arcuate distance travelled by the lawnmower 12 while the controller is driving the HSTs 56L, 56R according to the automated turning operation of the lawnmower 12. The controller 26 can be configured to use data from the wheel speed sensors 88 to determine the current arcuate distance travelled by the lawnmower 12 or the data from the three-axis gyroscope and/or the three-axis accelerometer to determine an angular displacement of the lawnmower 12. The controller 26 can be configured to compare the current arcuate distance to a predetermined distance threshold (or the current angular displacement to a predetermined angular threshold). The controller 26 can be configured to continue a first phase of the auto-turn operation of the lawn mower 12 until the current arcuate distance or angular displacement is equal to the predetermined distance threshold or the predetermined angular threshold, respectively.

The predetermined threshold can correspond to the arcuate travel distance from a start point PS on the current path P1 to a transition point PT on the left/right turn path. The path from the start point PS to the transition point PT can be referred to as phase 1 and the path from the transition point PT to the end point PE can be referred to as phase 2. The current arcuate distance or the current angular displacement can be referred to as a current orientation of the lawnmower 12. The current orientation can be an orientation of the lawnmower 12 relative to the previous path P1.

When the current orientation is equal to the predetermined threshold, the lawnmower 12 has completed travel along phase 1. The controller 26 can be configured to steer the lawnmower 12 along phase 2 by driving the outside motor at a predetermined inside transition speed and the inside motor at a predetermined outside transition speed so the lawnmower 12 can change the arcuate path and transition from the transition point PT to the end point PE where the lawnmower 12 can begin traveling along the new path P2, or the new path P3. The controller 26 can be configured to compare the orientation of the lawnmower along phase 2 to a second predetermined threshold. The controller 26 can be configured to maintain this transitional operation until the transitional arcuate distance is equal to a second predetermined threshold. Once the controller 26 determines that the lawnmower 12 has reached the end point PE, the controller 26 can resume the second mode control of the HSTs 56L, 56R according to the drive signals and/or neutral signals received from the sensors 32, 34 as described above with respect to FIG. 6.

The controller 26 can be configured to abort the automated turning operation prior to its completion if the operator moves either the right control lever 28 or the left control lever 30 into a predetermined position. For example, the controller 26 can be configured to abort the automated turning operation if the controller 26 receives a signal from the right sensor 32 that indicates the right control lever 28 has been moved into the neutral position N. Additionally, or alternatively, the controller 26 can be configured to abort the automated turning operation if the controller 26 receives a signal from the left sensor 34 that indicates that the left control lever 28 has been moved into the neutral position N.

When the controller 26 determines that the operator is turning the lawnmower manually, or when the controller 26 is performing the automated turning operation of the lawnmower 12, the controller 26 can be configured to perform the turning display control of step S120 of FIG. 11. During step S120 of FIG. 11, the controller 26 can be configured to enter the turning display control subroutine at step S162 of FIG. 14. The controller 26 can be configured to move from step S162 to step S164.

At step S164, the controller 26 can be configured to determine the current turning direction of the lawnmower 12 based on data from the sensors 32, 34 if the operator is manually steering the lawnmower 12, or from the signals from the switches 84, 86 if the controller 26 is executing an automated turning operation of the lawnmower 12. If the controller 26 determines that the lawnmower 12 is turning to the left (left turn condition), the controller 26 can move to step S166. If the controller 26 determines that the lawnmower 12 is turning to the right (right turn condition), the controller 26 can move to step S168.

At step S166, the controller 26 can be configured to send instructions to the operator LED indicator driver unit 108 to cause right light strip 148 to move the scrolling pattern from right to left across the right light strip 148 starting from the outer end 160 and ending at the inner end 162 and cause the left light strip 152 to move the scrolling pattern from the right to left across the left light strip 152 starting from the inner end 172 and ending at the outer end 170. The controller 26 can move from step S166 to step S170 and end the turning display control algorithm.

At step S168, the controller 26 can be configured to send instructions to the operator LED indicator driver unit 108 to cause right light strip 148 to move the scrolling pattern from left to right across the right light strip 148 starting from the inner end 162 and ending at the outer end 160 and cause the left light strip 152 to move the scrolling pattern from left to right across the left light strip 152 starting from the outer end 170 and ending at the inner end 172. The controller 26 can move from step S168 to step S170 and end the turning display control algorithm.

During an automated turning operation of the lawnmower 12, the controller 26 can be configured to terminate the scrolling pattern based on the predetermined movement of either of the control levers 28, 30 discussed above that causes the controller 26 to cease the automated turning operation.

Accordingly, the drive-by-wire system 10 can permit an operator of the lawnmower 12 to operate the control levers 28, 30 in either a first mode, which can mimic a traditional operation of the control levers 28, 30, or a second mode, which can simplify the input demand(s) on the operator and provide an increased precision in the directional control of the lawnmower 12 as compared to the first mode. Further, the display system 200 can enhance the operator's awareness of the operational status of the lawnmower 12. Further still, the drive-by-wire system 10 can provide one or more automated operations of the lawnmower 12 that can improve the performance of the lawnmower 12 in the second mode as compared to the first mode and provide obstacle detection and avoidance in both the first mode and the second mode.

The wheel speed sensors 88 can be mounted on an appropriate portion of the lawnmower 12 to detect rotation of the respective drive wheel 20L, 20R. The raw data from the wheel speed sensors 88 can be processed by one or both of the wheel speed sensors 88 or by the controller 26 to indicate a rotational velocity and direction of the respective drive wheels 20L, 20R. The wheel speed sensors 88 can be any type of sensor capable of providing the appropriate data.

Electrical communication lines and electrical power supply lines (not numbered) can connect the controller 26 to the other components and systems of the drive-by-wire system 10. Electrical communication can be either one-way communication or two-way communication and can be networked or not networked. The controller 26, the operator LED indicator driver unit 108, the ultrasonic sensor/LiDAR processing unit 110 and the vision system processing unit 112 also can be referred to as an electronic control unit (ECU) or as a central processing unit. the controller 26 and the units 108, 110, 112 can include a processor and a memory storage device. The controller 26 and the units 108, 110, 12 can be configured with hardware and/or software to perform the task(s) described above.

While certain embodiments of the invention are described above, it should be understood that the invention can be embodied and configured in many different ways without departing from the spirit and scope of the invention.

For example, embodiments are disclosed above in the context of lawnmower 12 shown in FIG. 1. However, embodiments are intended to include a drive-by-wire system for any type of vehicle. For example, the drive-by-wire system 10 can be used with a skid steer vehicle or a vehicle that is propelled by two or more tracks.

Embodiments are described above in the context of a lawnmower 12 that is powered by single power source 54 and driven by HSTs 56L, 56R. However, embodiments are intended to include an electric power source 54 that drives the blades 38 and a respective electric motor for each of the drive wheels 20L, 20R in replacement of the HSTs 56L, 56R.

A lawnmower 12 that is powered by an electric power source 54 can include an autonomous operation system that is configured to mow the lawn as an autonomous vehicle that does not require the presence of an operator on the lawnmower 12. The autonomous operation system can include a learning mode in which the operator drives the lawnmower 12 around the perimeter of the work area to define the operational boundary in which the lawnmower 12 will operate autonomously. During the learning mode, the display system 200 can operated in any manner described above. The autonomous operation system can include a cutting mode in which the lawnmower 12 autonomously traverses the work area learned during the learning mode and mows the vegetation in the work area. The cutting mode can implement the obstacle detection and automated turning features described above. The cutting mode can operate the display system 200 in any manner described above.

The lawnmower 12 shown in FIGS. 1, 2, 5-7, 9 and 15-17 is described as having a seat 18 for the operator. Alternative embodiments of the lawnmower can omit the seat 18 and include a platform on which the operator may stand while operating the lawnmower. The platform can be located at the rear end of the lawnmower. The size and location of the control levers 28, 30 can be changed to accommodate the change in orientation of the operator. The power source 54 can be moved forward so that it is in front of the platform.

The subroutines shown in FIGS. 12-14 are described as being incorporated into a single algorithm of FIG. 11. However, exemplary embodiments can include a controller 26 that is configured to execute the operations described with respect to FIGS. 11-14 as separate routines and the controller 26 can be configured to assign a priority to each display control if more than one display control is viable during the current operating conditions for the lawnmower.

For example, the controller 26 can be configured to prioritize the display of a tilt warning pattern over the obstacle warning pattern or the scrolling pattern.

Instead of the configuration shown in FIG. 6, the controller 26 can be configured such that the controller 26 determines the forward and reverse directions from the left handle 30 instead of the right handle 28, and determines the turning direction from the right handle 28 instead of the left handle 30 when in the second mode. Further, the drive-by-wire system 10 can include one or more inputs that enable the operator to selectively customize which of the control levers 28, 30 determines the forward and reverse directions and which of the handles 28, 30 controls the turning direction in the second mode.

Instead of mounting the mode selector 36 on the control panel 80, exemplary embodiments can include a mode switch on one of the control levers 28, 30.

Instead of the control levers 28, 30 described above, exemplary operator inputs can include a pair of joysticks, one on each side the seat 18, and mounted on or adjacent to a respective fender of the lawnmower 12.

Instead of mounting the automatic turn buttons 84, 86 on the left handle 30, the buttons 84, 86 can be mounted on the control panel 80.

The control system could be configured to allow automatic turning in accordance with the first mode. In this configuration, the automatic turn feature could be limited to operate when the control levers are both within a predetermined threshold of the maximum travel. The speed of the machine, and the speed of the turn, can be controlled with the aforementioned rotary knob or lever mounted to the handle.

The display device 94 is described above as including light strips mounted on or incorporated into the control levers. However, exemplary embodiments of the display device can include the light strips located remotely on the front of the machine, above a windscreen, inside an operator's helmet, or along the top or bottom of an operator's glasses. The LED indicator display functions could be emulated using an augmented reality display for the operator.

What is claimed is:

1. A display system for a drive-by-wire lawnmower including a first motor and a second motor, the display system comprising:
    a first operator input configured to transmit a first motor signal;
    a second operator input configured to transmit a second motor signal;
    a first display mounted on the first operator input;
    a second display mounted on the second operator input; and
    a controller configured for electrical communication with the first motor, the second motor, and in electrical communication with the first operator input, the second operator input, the first display, and the second display, the controller is configured to,
        determine a respective drive speed and a respective drive direction for each of the first motor and the second motor based on both of the first drive signal and the second drive signal, and
        cause the first display and the second display to present a predetermined pattern based on the first motor signal and the second motor signal.

2. The display system according to claim 1, wherein the controller is configured to select the predetermined pattern from a plurality of predetermined patterns that include, a scrolling pattern that scrolls from a first end of the each of the first display and the second display to a second end of each of the first display and the second display, an obstacle warning pattern that varies in size in accordance with a proximity of the lawnmower to a detected object, and a tilt warning pattern that flashes at a variable frequency that increases as a warning value decreases where the warning value is equal to a measured tilt angle subtracted from a predetermined threshold.

3. The display system according to claim 2, wherein the scrolling pattern includes a first predetermined color, the obstacle warning pattern includes a second predetermined color that is different from the first predetermined color, and the tilt warning pattern includes a third predetermined color that is different from the first predetermined color and the second predetermined color.

4. The display system according to claim 1, wherein the controller is configured to, determine a current condition from a plurality of conditions that includes a left turn condition and a right turn condition based on the first motor signal and the second motor signal, cause the first display and the second display to present the predetermined pattern as a scrolling pattern that moves across the first display and the second display from left to right when the controller determines that the current condition is the right turn condition, and cause the first display and the second display to present the predetermined pattern as a scrolling pattern that moves across the first display and second display from right to left when the controller determines that the current condition is the left turn condition.

5. The display system according to claim 1, wherein the controller is configured to, determine a current condition from a plurality of conditions that includes a straight travel condition and an automated turning condition based on an automated turn signal, the first motor signal, and the second motor signal, and cause the first display and the second display to present the predetermined pattern as a turning pattern that is indicative of a turning direction of the lawnmower when the controller determines that the current condition is the automated turning condition.

6. The display system according to claim 5, wherein the controller is configured to, compare the first motor signal and the second motor signal to a predetermined value after the controller determines the automated turning condition, and cause the first display and the second display to cease presenting the turning pattern when,
the first display and the second display present the turning pattern, and
one of the first motor signal and the second motor signal is different from the predetermined value.

7. The display system according to claim 1, wherein the controller is configured to, determine a current condition from a plurality of conditions that includes a forward travel condition and a reverse travel condition based on the first signal and the second signal, determine a secondary condition from a plurality of secondary conditions that include a clear path condition and an obstacle condition based on an object detection signal when the controller determines that the current condition is the reverse travel condition, and cause the first display and the second display to present the predetermined pattern as an obstacle warning pattern when the controller determines that the secondary condition is the obstacle condition.

8. The display system according to claim 7 wherein the obstacle warning pattern includes a near side pattern and a far side pattern that is smaller than the near side pattern, and the controller is configured to, determine whether an obstacle is closer to a first side of the lawnmower or a second side of the lawnmower based on the object detection signal, cause the first display to present the near side pattern and the second display to present the far side pattern when the controller determines at the object is closer to the first side of the lawnmower, and cause the first display to present the far side pattern and the second display to present the near side pattern when the controller determines at the object is closer to the second side of the lawnmower.

9. The display system according to claim 7, wherein the controller is configured to cause the first display and the second display to increase the size of the obstacle warning pattern as the lawnmower approaches an object based on the object detection signal.

10. The display system according to claim 7, wherein the controller is configured to, determine when an object is within a predetermined range of the lawnmower based on the object detection signal, and cause the first display and the second display to flash the obstacle warning pattern when the controller determines that the object is within the predetermined range.

11. The display system according to claim 1, wherein the predetermined pattern includes a high side pattern and a low side pattern that is different from the high side pattern, the controller is configured to, compare a tilt angle of the lawnmower to a first predetermined threshold, determine a tilt travel condition when the tilt angle is greater than the first predetermined threshold, and cause the first display to present the high side pattern and the second display to present the low side pattern when the controller determines the tilt condition.

12. The display system according to claim 11, wherein the controller is configured to, compare the tilt angle to a second predetermined threshold that is greater than the first predetermined threshold, and cause the first display to flash the high side pattern and the second display to flash the low side pattern at a variable frequency that increases as a difference value decreases, where the difference value is the tilt angle subtracted from the second predetermined threshold.

13. The display system according to claim 1, wherein the first operator input is a first lever having, a first end configured to be pivotally mounted on the lawnmower, and a second end that includes a first grip, the second operator input is a second lever having, a first end configured to be pivotally mounted on the lawnmower such that the second lever is pivotable independently of the first lever, and a second end that includes a second grip, the first display is adjacent to the first grip, and
the second display is adjacent to the second grip.

14. A display system for a lawnmower including a first motor and a second motor, the display system comprising:
a first operator handle configured to transmit a first motor signal and including a first hand grip, a first display, and a first space spacing the first display away from the first hand grip;
a second operator handle configured to transmit a second motor signal and including a second hand grip, a second display, and a second space spacing the second display away from the second hand grip; and
a controller configured to be in electrical communication with the first motor, the second motor and in electrical communication with the first operator handle, the second operator handle, the first display, and the second display, the controller is configured to,
determine a respective drive speed and a respective drive direction for each of the first motor and the second motor based on both of the first motor signal and the second motor signal,
select from a plurality of display patterns that are different from each other based on the first motor signal and the second motor signal, and
cause the first display and the second display to present a selected one of the display patterns.

15. The display system according to claim 14, wherein each of the first display and the second display includes a plurality of light emitting diodes.

16. The display system according to claim 14, wherein the display patterns include an automated turn pattern, an obstacle warning pattern, and a tilt warning pattern,
the controller is configured to,
determine a turning direction of the lawnmower when the controller receives an automated turn signal,
cause the first display and the second display to present the automated turn pattern to indicate the turning direction of the lawnmower when the controller receives an automated turn signal and each of the first motor signal and the second motor signal correspond to a predetermined value,
determine whether the lawnmower is traveling in a reverse direction,
cause the first display and the second display to present the obstacle warning pattern when the controller determines that the lawnmower is traveling in the reverse direction and receives a detection signal that is indicative of an object located in a path of travel of the lawnmower, and
cause the first display and the second display to present the tilt warning pattern when the controller receives a tilt angle signal that is indicative of a tilt angle of the lawnmower that exceeds a predetermined threshold.

17. The display system according to claim 16, wherein the controller is configured to,
cause the first display and the second display to scroll the turn pattern across the first display and the second display in a manner that indicates the turning direction of the lawnmower when the controller receives the automated turn signal,
cause the first display to present the obstacle warning pattern as a first pattern having a first size and the second display to present the obstacle warning pattern as a second pattern having a second size that is different from the first size when the controller receives the detection signal that is indicative of the object located in the path of travel of the lawnmower, and
cause the first display to present the tilt warning pattern as a third pattern having a third size and the second display to present the tilt warning pattern as a fourth pattern having a fourth size that is different from the third size when the controller receives the tilt angle signal that is indicative of the tilt angle of the lawnmower that exceeds the predetermined threshold.

18. A lawnmower comprising:
a frame;
a mower deck suspended from the frame and including at least one cutting chamber and at least one blade rotatably mounted in the cutting chamber;
a first motor and a second motor;
a first wheel connected to the frame and the first motor;
a second wheel connected to the frame and the second motor;
a first operator handle pivotally mounted on the frame, configured to transmit a first motor signal, and including a first hand grip, and a first display;
a second operator handle pivotally mounted on the frame, configured to transmit a second motor signal, and including a second hand grip, and a second display; and
a controller in electrical communication with the first motor, the second motor, the first operator handle, the second operator handle, the first display, and the second display, wherein the controller is configured to,
determine a drive speed and a drive direction for each of the first motor and the second motor based on both of the first motor signal and the second motor signal,
cause the first motor and second motor to operate according to the drive speed and the drive direction,
select from a plurality of display patterns that are different from each other based on the first motor signal and the second motor signal, and
cause the first display and the second display to present a selected one of the display patterns.

19. The lawnmower according to claim 18, further comprising:
an automatic turn input electrically connected to the controller and configured to output a third signal, wherein
the plurality of display patterns includes a turning pattern, and
the controller is configured to,
determine an automated turn condition from the third signal, and
cause the first motor and the second motor to drive the lawnmower through a predetermined arcuate path of travel when the controller determines the automated turn condition and each of the first motor signal and the second motor signal corresponds to a predetermined value, and
cause the first display and the second display to scroll the turning pattern across the first display and the second display in a direction that is indicative of the direction of travel of the lawnmower when the controller causes the first motor and the second motor to drive the lawnmower through the predetermined path of travel.

20. The lawnmower according to claim 18, further comprising:
an object detection sensor configured to output a fourth signal; and
a tilt angle sensor configured to output a fifth signal, wherein the plurality of display patterns includes an obstacle warning pattern and a tilt warning pattern, and the controller is configured to, determine a current condition from a plurality of conditions that include a forward drive condition and a reverse drive condition from the first motor signal and the second motor signal, determine whether an object is located in a path of travel of the lawnmower based on the fourth signal when the controller determines that the current condition is the reverse drive condition, cause the first display and the second display to present the obstacle warning pattern when the controller determines that the object is in the path of travel of the lawnmower, determine a tilt angle of the lawnmower based on the fifth signal, and cause the first display and the second display to present the tilt warning pattern when the controller determines that the tilt angle exceeds a predetermined threshold and determines that the current condition is the forward drive condition or the reverse drive condition.

\* \* \* \* \*